United States Patent
Schmidt

(10) Patent No.: US 10,365,415 B2
(45) Date of Patent: Jul. 30, 2019

(54) ARTICLES COMPRISING SELF-ASSEMBLED LAYERS COMPRISING NANOPARTICLES WITH A PHOSPHOROUS SURFACE TREATMENT

(71) Applicant: 3M INNOVATIVE PROPERTIES COMPANY, St. Paul, MN (US)

(72) Inventor: Daniel J. Schmidt, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 300 days.

(21) Appl. No.: 15/103,948

(22) PCT Filed: Dec. 17, 2014

(86) PCT No.: PCT/US2014/070841
§ 371 (c)(1),
(2) Date: Jun. 13, 2016

(87) PCT Pub. No.: WO2015/095317
PCT Pub. Date: Jun. 25, 2015

(65) Prior Publication Data
US 2016/0320533 A1    Nov. 3, 2016

Related U.S. Application Data

(60) Provisional application No. 61/918,034, filed on Dec. 19, 2013.

(51) Int. Cl.
G02B 5/08    (2006.01)
G02B 1/14    (2015.01)
(Continued)

(52) U.S. Cl.
CPC ........... *G02B 5/0841* (2013.01); *G02B 1/005* (2013.01); *G02B 1/105* (2013.01); *G02B 1/14* (2015.01);
(Continued)

(58) Field of Classification Search
None
See application file for complete search history.

(56) References Cited

U.S. PATENT DOCUMENTS 3,485,658 A    12/1969    Iler
5,126,394 A    6/1992    Revis
(Continued)

FOREIGN PATENT DOCUMENTS

CN    102779900    11/2012
JP    2009-058703    3/2009
(Continued)

OTHER PUBLICATIONS

Pawsey et al., Langmuir, vol. 2002, No. 18, "Self-Assembly of Carboxyalkylp hosphonic Acids on Metal Oxide Powders," p. 5205-5212.
(Continued)

*Primary Examiner* — David Sample
(74) *Attorney, Agent, or Firm* — Carolyn A. Fischer

(57) ABSTRACT

An article is described comprising a substrate and a plurality of layers deposited by layer-by-layer self-assembly disposed on the substrate. A portion of the layers comprise inorganic oxide nanoparticles comprising a phosphorous-containing surface treatment. Also described is an article comprising a bi-layer, the bi-layer comprises a monolayer of a polycation and a monolayer of a polyanion. The polyanion comprises inorganic oxide nanoparticles comprising a phosphorous-containing surface treatment. The polycations may be a polyelectrolyte or inorganic oxide nanoparticles.

17 Claims, 7 Drawing Sheets

(51) Int. Cl.
*G02B 5/30* (2006.01)
*G02B 1/00* (2006.01)
*G02B 1/10* (2015.01)
*G02B 5/28* (2006.01)
*B82Y 20/00* (2011.01)
*B82Y 30/00* (2011.01)

(52) U.S. Cl.
CPC ......... *G02B 5/0816* (2013.01); *G02B 5/0891* (2013.01); *G02B 5/287* (2013.01); *G02B 5/3083* (2013.01); *B82Y 20/00* (2013.01); *B82Y 30/00* (2013.01); *G02B 2207/101* (2013.01)

(56) References Cited

U.S. PATENT DOCUMENTS

| | | | |
|---|---|---|---|
| 5,882,774 | A | 3/1999 | Jonza |
| 6,316,084 | B1 | 11/2001 | Claus |
| 6,352,761 | B1 | 3/2002 | Hebrink |
| 6,376,590 | B2 | 4/2002 | Kolb |
| 6,449,093 | B2 | 9/2002 | Hebrink |
| 6,783,349 | B2 | 8/2004 | Neavin |
| 7,153,588 | B2 | 12/2006 | McMan |
| 8,234,998 | B2 | 8/2012 | Krogman |
| 8,277,899 | B2 | 10/2012 | Krogman |
| 8,313,798 | B2 | 11/2012 | Nogueira |
| 2002/0037383 | A1 | 3/2002 | Spillman, Jr. |
| 2006/0084780 | A1 | 4/2006 | Hebrink |
| 2006/0148950 | A1 | 7/2006 | Davidson |
| 2008/0049326 | A1 | 2/2008 | Hanson |
| 2008/0206347 | A1 | 8/2008 | Marra |
| 2009/0054555 | A1* | 2/2009 | Baldi .............. C07C 259/06 523/202 |
| 2009/0283144 | A1 | 11/2009 | Hebrink |
| 2010/0290109 | A1 | 11/2010 | Kurt |
| 2011/0064936 | A1 | 3/2011 | Hammond-Cunningham |
| 2012/0011850 | A1 | 1/2012 | Hebrink |
| 2012/0071680 | A1 | 3/2012 | Tokumitsu |
| 2013/0295586 | A1 | 11/2013 | Bartel |
| 2016/0068703 | A1* | 3/2016 | Schmidt .............. C09D 5/00 428/520 |

FOREIGN PATENT DOCUMENTS

| | | |
|---|---|---|
| WO | WO 2009-085926 | 7/2009 |
| WO | WO 2012-112624 | 8/2012 |
| WO | WO 2013-052927 | 4/2013 |
| WO | WO 2013-142239 | 9/2013 |
| WO | WO 2014-099367 | 6/2014 |
| WO | WO 2014-193550 | 12/2014 |

OTHER PUBLICATIONS

Bae, "Fabrication of Antireflective Films Composed of High and Low Refractive Index Layers Using Layer-by-Layer Self-Assembly Method," Solid State Phenomena, Jun. 2007, vol. 124-126, pp. 559-562.

Berg, "Self-Assembled Nanostructured Multilayered Spectral Filters," Proc. SPIE 2006, vol. 6172, pp. 61720W-1-61720W-5.

Decher, "Fuzzy Nanoassemblies: Toward Layered Polymeric Multicomposites," Science, Aug. 1997, vol. 277, pp. 1232-1237.

Du, "Hollow Silica Nanoparticles in UV-Visible Antireflection Coatings for Poly (methyl methacrylate) Substrates," ACS NANO, 2010, vol. 4, No. 7, pp. 4308-4316.

Fujimoto, "Self-Assembled Nano-Heterostructural Thin Film for Optical Lens," Japanese Journal of Applied Physics, 2011, vol. 50, No. 4R, pp. 045803-1-045803-5.

Gemici, "Hydrothermal Treatment of Nanoparticle Thin Films for Enhanced Mechanical Durability," Langmuir, 2008, vol. 24, No. 5, pp. 2168-2177.

Iler, "Multilayers of Colloidal Particles," Journal of Colloid and Interface Science, 1966. vol. 21, No. 6, pp. 569-594.

Kim, "A Layer-by-Layer Self-Assembly Method for Organic-Inorganic Hybrid Multilayer Thin Films," Journal of Ceramic Processing Research, 2009, vol. 10, No. 6, pp. 770-773.

Kim, "Design of a thin film for optical applications, consisting of high and low refractive index multilayers, fabricated by a layer-by-layer self-assembly method," Colloids and Surfaces A: Physicochemical and Engineering Aspects, 2006, vol. 284-285, pp. 290-294.

Kim, "Self-Assembly of Iron Oxide Nanoparticles mediated by Phospholipids," Proceedings of 3rd International Nanoelectronics Conference, INEC 2010, pp. 1010-1011.

Kurt, "Structural Color via Layer-by-Layer Deposition: Layered Nanoparticle Arrays With Near-UV and Visible Reflectivity Bands," Journal of Materials Chemistry, 2009, vol. 19, No. 47, pp. 8920-8927.

Kyung, Control of Structure and Film Thickness Using Spray Layer-by-Layer Method: Application to Double-Layer Anti-Reflection Film, Japanese Journal of Applied Physics, 2011, vol. 50, pp. 035803-1-035803-5.

Lee, "Adsorption of Ordered Zirconium Phosphonate Multilayer Films on Silicon and Gold Surfaces," The Journal of Physical Chemistry, 1988, vol. 92, No. 9, pp. 2597-2601.

Lee, "Multilayers of Oppositely Charged $SiO_2$ Nanoparticles: Effect of Surface Charge on Multilayer Assembly," Langmuir, 2007, vol. 23, No. 17, pp. 8833-8837.

Li, "Layer-By-Layer Assembled Nanohybrid Multilayer Membranes for Pervaporation Dehydration of Acetone-Water Mixtures," Journal of Membrane Science, 2012, vol. 415-416, pp. 745-757.

Liu, "Layer-By-Layer Deposition of Zirconium Oxide Films From Aqueous Solutions for Friction Reduction in Silicon-Based Microelectromechanical System Devices," Thin Solid Films, 2005, vol. 492, pp. 6-12.

Mulhearn, "Facilitated Transport Enhances Spray Layer-by-Layer Assembly of Oppositely Charged Nanoparticles," Soft Matter, 2012, vol. 8, No. 40, pp. 10419-10427.

Nogueira, "Spray-Layer-By-Layer Assembly Can More Rapidly Produce Optical-Quality Multistack Heterostructures," Langmuir, 2011, vol. 27, No. 12, pp. 7860-7867.

Qiao, "Direct Electron Transfer and Electrocatalysis of Myoglobin Loaded in Layer-by-Layer Films Assembled With Nonionic Poly(Ethylene Glycol) and $ZrO_2$ Nanoparticles," Bioelectrochemistry, 2009, vol. 75, No. 1, pp. 71-76.

Rosidian, "Ionic Self-Assembly of Ultrahard $ZrO_2$/Polymer Nanocomposite Thin Films," Advanced Materials, 1998, vol. 10, No. 14, pp. 1087-1091.

Shimomura, "Layer-by-Layer-Assembled High-Performance Broadband Antireflection Coatings," ACS Applied Materials & Interfaces, Feb. 2010, vol. 2, No. 3, pp. 813-820.

Smirnov, "Selective UV Reflecting Mirrors Based on Nanoparticle Multilayers," Advanced Functional Materials, 2013, vol. 23, pp. 2805-2811.

Wu, "Structural Color in Porous, Superhydrophilic, and Self-Cleaning $SiO_2/TiO_2$ Bragg Stacks," Small, 2007, vol. 3, No. 8, pp. 1445-1451.

International Search Report for PCT International Application No. PCT/US2014/070841, dated Apr. 8, 2015, 4 pages.

Yang, "Loading of Myoglobin into Multilayer Films Assembled by $ZrO_2$ Nanoparticles and Phytic Acid: Electrochemistry and Electrocatalysis" Journal of Nanoscience and Nanotechnology, 2009, vol. 9, No. 4, pp. 2442-2449.

Yu, "Layer-by-Layer Assembly of Polyelectrolyte/$TiO_2$ Thin Films With Reflection-Enhancing Function," Optical Materials, 2006, vol. 28, No. 12, pp. 1381-1384.

Yuan, "Organic Pigment Particles Coated With Colloidal Nano-Silica Particles via Layer-by-Layer Assembly," Chemistry of Materials, Jun. 2005, vol. 17, No. 14, pp. 3587-3594.

Zhang, "Double-Layered $TiO_2$—$SiO_2$ Nanostructured Films with Self-Cleaning and Antireflective Properties," Journal of Physical Chemistry B, 2006, vol. 110, No. 50, pp. 25142-25148.

(56) References Cited

OTHER PUBLICATIONS

Zhou, "Layer-by-Layer Assembled Highly Reflective Optical Coatings," Proc. of SPIE, 2007, vol. 6722, pp. 67222W-1-67222W-4.

* cited by examiner

US 10,365,415 B2

ARTICLES COMPRISING SELF-ASSEMBLED LAYERS COMPRISING NANOPARTICLES WITH A PHOSPHOROUS SURFACE TREATMENT

CROSS REFRENCE TO REALATED APPLICATIONS

This application is a national stage filing under 35 U.S.C 371 of PCT/US2014/070841, filed Dec. 19, 2014, which claims the benefit of Provisional Application No. 61/918,034, filed Dec. 19, 2013, the disclosure of which is incorporated by reference in its/their entirety herein.

SUMMARY

In one embodiment, an article is described comprising a substrate and a plurality of layers deposited by layer-by-layer self-assembly disposed on the substrate. A portion of the layers comprise inorganic oxide nanoparticles comprising a phosphorous-containing surface treatment.

In another embodiment, an article is described comprising a bi-layer comprising a monolayer of a polycation and a monolayer of a polyanion. The polyanion comprises inorganic oxide nanoparticles comprising a phosphorous-containing surface treatment. The polycations may be a polyelectrolyte or inorganic oxide nanoparticles.

In yet another embodiment, a method of making an article is described comprising providing a substrate and disposing onto the substrate a plurality of layers deposited by layer-by-layer self-assembly. At least a portion of the layers comprise inorganic oxide nanoparticles comprising a phosphorous-containing surface treatment.

In some favored embodiments, the inorganic oxide nanoparticles have a refractive index of at least 1.60. The phosphorous-containing surface treatment is typically a phosphorous-containing acid or salt thereof.

DETAILED DESCRIPTION

Figure 1:
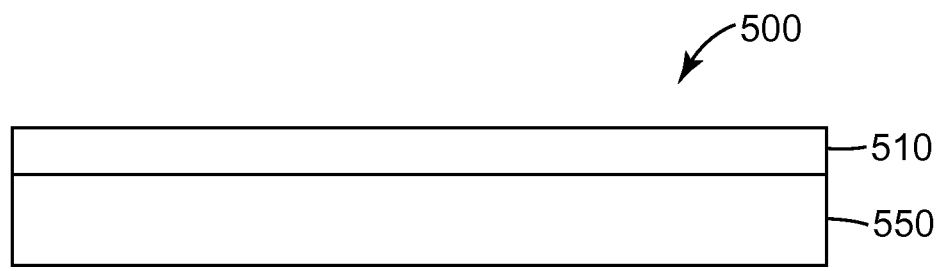
FIG. 1 is a cross sectional view of an illustrative article 500 comprising a substrate 550 and a plurality of layers deposited by layer-by-layer self-assembly 510, disposed on substrate 550.

As used in this application:

"polymer" means organic polymers and copolymers (i.e., polymers formed from two or more monomers or comonomers, including terpolymers, for example), as well as copolymers or polymers that can be formed in a miscible blend by, for example, coextrusion or reaction, including transesterification, for example. Block, random, graft, and alternating polymers are included;

"polyion" refers to a polyelectrolyte or inorganic oxide particle that is (negatively or positively) charged in aqueous solution (water);

"polycation" refers to a polyelectrolyte or inorganic oxide particle that is positively charged in aqueous solution (water);

"polyanion" refers to a polyelectrolyte or inorganic oxide particle that is negatively charged in aqueous solution (water);

"polyelectrolytes" are polymers whose repeating units bear an electrolyte group. The electrolyte groups can dissociate in aqueous solutions (water), making the polymers charged. Polyelectrolyte properties are thus similar to both electrolytes (salts) and polymers (high molecular weight compounds), and are sometimes called polysalts. Like salts, their solutions are electrically conductive. "Strong polyelectrolytes" possess permanent charges across a wide range of pH (e.g., polymers containing quaternary ammonium groups or sulfonic acid groups). "Weak polyelectrolytes" possess a pH-dependent level of charge (e.g. polymers containing primary, secondary, or tertiary amines, or carboxylic acids);

"(meth)acryl" refers to methacrylate, methacrylamide, acrylate, or acrylamide;

"index of refraction", also referred to as "index" or "RI", refers to a refractive index of a material in the plane of the material with respect to light at 633 nm and normal or near normal (i.e. 8 degrees) incidence, unless otherwise indicated;

"high refractive index" and "low refractive index" are relative terms; when two layers are compared in both in-plane directions of interest, the layer that has a greater average in-plane refractive index is the high refractive index layer, and the layer that has a lower average in-plane refractive index is the low refractive index layer;

"birefringent" means that the indices of refraction in orthogonal x, y, and z directions are not all the same. Index of refraction is designated as $n_x$, $n_y$, and $n_z$ for x, y, and z directions, respectively. For the polymer layers described herein, the axes are selected so that x and y axes are in the plane of the layer and the z axis is normal to the plane of the layer and typically corresponds to the thickness or height of the layer. Where a refractive index in one in-plane direction is larger than a refractive index in another in-plane direction, the x-axis is generally chosen to be the in-plane direction with the largest index of refraction, which sometimes corresponds to one of the directions in which the optical film is oriented (e.g., stretched). Birefringence values are expressed herein with respect to light at 633 nm and normal incidence, unless otherwise indicated;

"in-plane birefringence, $\Delta n_{in}$," of a uniaxially stretched film concerns the difference of the indices ($n_x$ and $n_y$) in the orthogonal in-plane directions. More specifically for a uniaxially stretched film, in-plane birefringence refers to the difference between the stretching direction and the non-stretching direction. For example, assuming a film is uniaxially stretched in the machine direction (MD), the in-plane birefringence is expressed as the following:

$$\Delta n_{in} = n_x - n_y$$

where $n_x$ is the refractive index in the stretching direction (in this case, MD), and $n_y$ is the refractive index in the non-stretching direction (in this case, transverse direction (TD)). For a biaxially stretched film, the in-plane birefringence is relatively small and sometimes close to zero if balanced. Instead, out-of-plane birefringence is more indicative of the birefringent nature of the stretched film;

"out-of-plane birefringence, $\Delta n_{out}$" of a biaxially oriented film, concerns the difference between average of in-plane indices ($n_x$ and $n_y$) and the index normal to the film ($n_z$). Out-of-plane birefringence can be expressed as the following:

$$\Delta n_{out} = \frac{(n_x + n_y)}{2} - n_z$$

where $n_x$ is RI in MD and $n_y$ is RI in TD and $n_z$ is RI normal to the film. Out-of-plane birefringence can also be used to measure the birefringent nature of uniaxially stretched films;

"reflectivity" refers to reflectivity at normal incidence which is understood to include slight deviations from 90 degrees (e.g. 8 degree deviation) unless specified otherwise.

Unless specified otherwise, a bandwidth refers to any increment of at least 10 nm of electromagnetic radiation between 290 nm and 1100 nm. A bandwidth may also be greater than 10 nm such as 25 nm, 50 nm, or 100 nm. As used herein, visible light refers to the bandwidth from 400 nm to 700 nm; ultraviolet refers to the bandwidth 290 to 400 nm; UV-blue is the bandwidth from 350 to 490 nm; and near infrared refers to the bandwidth from 870 to 1100 nm.

With reference to FIG. 1, an illustrative article 500 generally comprises a substrate 550 and a plurality of layers 510 deposited by layer-by-layer self-assembly disposed on the substrate 550. At least a portion of the layers comprise inorganic oxide nanoparticles. The inorganic oxide nanoparticles comprise a phosphorous-containing surface treatment. Although FIG. 1 depicts the plurality of layers deposited by layer-by-layer self-assembly on a single major surface, in another embodiment both major surfaces of substrate 550 can comprise a plurality of layers 510 deposited by layer-by-layer self-assembly.

The plurality of layers disposed on the substrate or coating comprise at least two layers deposited by what is commonly referred to as a "layer-by-layer self-assembly process". This process is commonly used to assemble films or coatings of oppositely charged polyions such as polyelectrolytes and/or inorganic oxide particles electrostatically, but other functionalities such as hydrogen bond donor/acceptors, metal ions/ligands, and covalent bonding moieties can be the driving force for film assembly. Typically, this deposition process involves exposing the substrate having a surface charge, to a series of liquid solutions, or baths. This can be accomplished by immersion of the substrate into liquid baths (also referred to as dip coating), spraying, spin coating, roll coating, inkjet printing, and the like. Exposure to the first polyion (e.g. polyelectrolyte bath) liquid solution, which has charge opposite that of the substrate, results in charged species near the substrate surface adsorbing quickly. This establishes a concentration gradient and draws more polyelectrolyte from the bulk solution to the surface. Further adsorption occurs until a sufficient layer has developed to mask the underlying charge and reverse the net charge of the substrate surface. In order for mass transfer and adsorption to occur, this exposure time is typically on the order of minutes. The substrate is then removed from the first polyion (e.g. bath) liquid solution, and is then exposed to a series of water rinse baths to remove any physically entangled or loosely bound polyelectrolyte. Following these rinse (e.g. bath) liquid solutions, the substrate is then exposed to a second polyion (e.g. polyelectrolyte or inorganic oxide nanoparticle bath) liquid solution, which has charge opposite that of the first polyion (e.g. bath) liquid solution. Once again adsorption occurs, since the surface charge of the substrate is opposite that of the second (e.g. bath) liquid solution. Continued exposure to the second polyion (e.g. bath) liquid solution then results in a reversal of the surface charge of the substrate. A subsequent rinsing can be performed to complete the cycle. This sequence of steps is said to build up one layer pair, also referred to herein as a "bi-layer" of deposition and can be repeated as desired to add further layer pairs to the substrate.

Some examples of suitable processes include those described in Krogman et al., U.S. Pat. No. 8,234,998; Hammond-Cunningham et al., US2011/0064936; and Nogueira et al., U.S. Pat. No. 8,313,798. Further layer-by-layer dip coating can be conducted using a StratoSequence VI (nanoStrata Inc., Tallahassee, Fla.) dip coating robot.

In favored embodiments, the plurality of layers deposited by layer-by-layer self-assembly (i.e. self-assembled layers) comprise inorganic oxide nanoparticles having a refractive index of at least 1.60. In some embodiments, the refractive index of the inorganic oxide nanoparticles is at least 1.65, 1.70, 1.75, 1.80, 1.85, 1.90, 1.95, 2.00, 2.05, or 2.10. The refractive index of the inorganic oxide nanoparticles is typically no greater than 2.55 or 2.61. Various high refractive index inorganic oxide nanoparticle are known such as titania, zirconia, alumina, tin oxides, antimony oxides, ceria, zinc oxide, lanthanum oxide, tantalum oxide, mixed metal oxides thereof, and mixtures thereof.

Without intending to be bound by theory, it is surmised that the phosphorous-containing surface treatment improves the packing density of the nanoparticles during the layer-by-layer self assembly. When the inorganic oxide nanoparticles are high refractive index particles, the improved packing density can result in less air being incorporated and the bi-layer having a higher refractive index. The increase in refractive index as compared to the same (e.g. zirconia) inorganic oxide nanoparticles lacking the phosphorous-containing surface treatment can be at least 0.05, or 0.10, or 0.15, or 0.20, or 0.25, or 0.30 and is typically no greater than about 0.35.

In other embodiments, the improved packing density can improve the barrier properties of the plurality of layers deposited by layer-by-layer self-assembly. In this embodiment, the inorganic oxide nanoparticles may alternatively be low refractive index particles, i.e. having a refractive index of at least 1.45 and less than 1.60 or 1.55. For example, the nanoparticles comprising the phosphorous-containing surface treatment may be clay platelet nanoparticles, such as montmorillonite, bentonite, and hectorite. In this embodiment, the plurality of layers deposited by layer-by-layer self-assembly may provide flame retardance, oxygen barrier, water barrier, and/or corrosion-resistance properties to the substrate.

The phosphorous-containing surface treatment can also be utilized to alter the charge of the inorganic oxide nanoparticles. For example, a polycation comprising positively charged inorganic oxide nanoparticles can be converted to a polyanion. Further, the phosphorous-containing surface treatment can also be utilized to modify the isoelectric point, i.e. the pH at which there is no net charge and the nanoparticles can precipitate from solution. These technical effects are applicable to most any inorganic oxide nanoparticle, regardless of the refractive index. Various inorganic oxide nanoparticles have been described for use for layer-by-layer self-assembly some of which are described in Kurt et al., US 2010/0290109; incorporated herein by reference.

In some embodiments, wherein the plurality of layers deposited by layer-by-layer self-assembly are light transmissive, the size of such nanoparticles is chosen to avoid significant visible light scattering. The surface modified inorganic oxide nanoparticles have a (e.g. unassociated) primary particle size or associated particle size of greater than 1 nm, 5 nm or 10 nm. The primary or associated particle size is generally and less than 100 nm, 75 nm, or 50 nm. Typically the primary or associated particle size is less than 40 nm, 30 nm, or 20 nm. It is preferred that the nanoparticles are unassociated.

The average particle size of the nanoparticles of the dried self-assembled layers can be measured using transmission electron microscopy (TEM) or scanning electron microscopy, for example. The average particle size of the nanoparticles in the nanoparticle suspension can be measured using dynamic light scattering. "Agglomerate" refers to a weak association between primary particles which may be held together by charge or polarity and can be broken down into smaller entities. "Primary particle size" refers to the mean diameter of a single (non-aggregate, non-agglomerate) particle. As used herein "aggregate" with respect to particles refers to strongly bonded or fused particles where the resulting external surface area may be significantly smaller than the sum of calculated surface areas of the individual components. The forces holding an aggregate together are strong forces, for example covalent bonds, or those resulting from sintering or complex physical entanglement. Although agglomerated nanoparticles can be broken down into smaller entities such as discrete primary particles such as by application of a surface treatment; the application of a surface treatment to an aggregate simply results in a surface treated aggregate. In some embodiments, a majority of the nanoparticles (i.e. at least 50%) are present as discrete unagglomerated nanoparticles. For example, at least 70%, 80% or 90% of the nanoparticles are present as discrete unagglomerated nanoparticles.

Surface modified colloidal nanoparticles can be substantially fully condensed. Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray defraction techniques. Condensed crystalline (e.g. zirconia) nanoparticles have a high refractive index whereas amorphous nanoparticles typically have a lower refractive index.

Various high refractive index inorganic oxide sols are commercially available. Zirconia sols are available from Nalco Chemical Co. (Naperville, Ill.) under the trade designation "Nalco 00SS008", Buhler AG (Uzwil, Switzerland) under the trade designation "Buhler zirconia Z-WO sol" and Nissan Chemical America Corporation (Houston, Tex.) under the trade name NanoUse ZR™. A nanoparticle dispersion that comprises a mixture of tin oxide and zirconia covered by antimony oxide (RI~1.9) is commercially available from Nissan Chemical America Corporation (Houston, Tex.) under the trade designation "HX-05M5". A tin oxide nanoparticle dispersion (RI~2.0) is commercially available from Nissan Chemicals Corp. under the trade designation "CX-S501M".

In some embodiments, the layer-by-layer self-assembled polymer-nanoparticle layers comprise titania. Various forms of titania can be utilized including anatase, brookite, rutile and amorphous forms. Anatase titania nanoparticle (5-15 nm diameter) dispersions are commercially available from U.S. Research Nanomaterials (Houston, Tex.) as an aqueous suspension at 15 wt %. $TiO_2$ sols are also available dispersed in strong acid or base condition from Ishihara Sangyo Kaisha Ltd. (Osaka, Japan). Titania has an isoelectric point at about pH 4-6 and thus can be used as a polyanion in layer-by-layer self-assembly at pH greater than 6, preferably pH greater than 7, more preferably pH greater than 8, or the polycation in layer-by-layer self-assembly at pH less than 4, more preferably pH less than 3.

In some embodiments, the layer-by-layer self-assembled polymer-nanoparticle layers comprise zirconia prepared using hydrothermal technology as described in U.S. Patent Publication No. 2006/0148950 (Davidson et al.) and U.S. Pat. No. 6,376,590 (Kolb et al.).

More specifically, a first feedstock that contains a zirconium salt is subjected to a first hydrothermal treatment to form a zirconium-containing intermediate and a byproduct. A second feedstock is prepared by removing at least a portion of the byproduct formed during the first hydrothermal treatment. The second feedstock is then subjected to a second hydrothermal treatment to form a zirconia sol that contains the zirconia particles.

The first feedstock is prepared by forming an aqueous precursor solution that contains a zirconium salt. The anion of the zirconium salt is usually chosen so that it can be removed during subsequent steps in the process for preparing the zirconia sol. Additionally, the anion is often chosen to be non-corrosive, allowing greater flexibility in the type of material chosen for the processing equipment such as the hydrothermal reactors.

In one method of at least partially removing the anions in the precursor solution, the precursor solution can be heated to vaporize an acidic form of the anion. For example, a carboxylate anion having no more than four carbon atoms can be removed as the corresponding carboxylic acid. More specifically, an acetate anion can be removed as acetic acid. Although the free acetic acid can be removed, at least a portion of the acetic acid is typically adsorbed on the (e.g. zirconia) nanoparticle surface. Thus, the nanoparticles typically comprise adsorbed volatile acid. Due to the adsorbed acid, the zirconia nanoparticles can be positively charged and thus function as polycations.

Surface modification involves attaching surface treatment compounds to the inorganic oxide (e.g. zirconia) nanoparticles to modify the surface characteristics. The surface modification of the inorganic oxide nanoparticles in the colloidal dispersion can be accomplished in a variety of ways. The process generally involves mixing the inorganic nanoparticle with the phosphorous-containing surface treatment compounds. Optionally, a co-solvent can be added at this point, such as for example, 1-methoxy-2-propanol, ethanol, isopropanol, ethylene glycol, N,N-dimethylacetamide and 1-methyl-2-pyrrolidinone. The co-solvent can enhance the solubility of the surface modifying agents as well as the surface modified particles. The mixture comprising the inorganic sol and surface modifying agents is subsequently reacted at room or an elevated temperature, with or without mixing. Excess surface modifying agents can be removed from the suspension by techniques such as dialysis or diafiltration. The inorganic oxides nanoparticles comprising the surface treatment compound are often non-associated, non-agglomerated, or a combination thereof in the aqueous dispersion.

The inorganic oxide nanoparticles comprise a phosphorous-containing surface treatment. The phosphorous-containing surface treatment is a phosphorous-containing acid or salt thereof (having a counterion). In some embodiments, the phosphorous-containing surface treatment is an organophosphorous (i.e. further comprising carbon atoms) acid or salt thereof. In other embodiments, the phosphorous-containing surface treatment is an inorganic (i.e. lacking carbon atoms) acid or salt thereof. The phosphorous-containing surface treatment typically comprises at least two negatively charged groups, such that one group can attach and neutralize an acid group on the inorganic oxide (e.g. zirconia) nanoparticle surface and the other group(s) can render the inorganic oxide (e.g. zirconia) nanoparticle surface negatively charged. "Negatively charged group" refers to the dissociated salt form or the acid form which can dissociate according to the pKa of the acid group. One or both of the negatively charged groups of the surface treatment compound is a negatively charged phosphorous-containing group.

The phosphorous-containing surface treatment may be an acid having the general structure

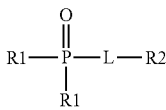

wherein L is oxygen or an alkylene group optionally substituted with OH groups; or L-R2 is H, OH, or $C_1$-$C_{12}$ alkyl;
R1 is OH; and
R2 is negatively charged group such as $PO_3H_2$, $SO_3H$, COOH; or
a salt thereof.

The alkylene group typically has 1 to 12 carbon atoms. In some embodiments, the alkylene group has no greater than 8, 6 or 4 carbon atoms.

When the phosphorous-containing surface treatment is a (e.g. acid) salt one or more of the hydrogen atoms of the acid group are replaced by a metal or other cation. Typically acid salts have one or more alkali (alkaline) metal ions such as sodium or potassiumas a positively charged counterion ($A^+$). Ammonium (NH4+) may also be the positively charged counterion. Thus, when the phosphorous-containing surface treatment is a salt, R1 can be $O^-A^+$. Further R2 can be for example $PO_3^{2-}A^+$, $SO_3^-A^+$, or $COO^-A^+$.

When L-R2 is H or $C_1$-$C_{12}$ alkyl, the phosphorous containing compound is a diprotic phosphonic ($H_3PO_3$) or triprotic phosphoric acid ($H_3PO_4$). Such acids can be utilized as a surface modifier at a pH between the pKas of the two acidic protons. In some embodiments, the alkyl group of the diprotic acid has no greater than 8, 6, 4, 3, 2 or 1 carbon atoms. In this embodiment, the negatively charged groups can be the R1 (i.e. OH) groups.

Illustrative surface treatments of this structure include pyrophosphoric acid having the structure

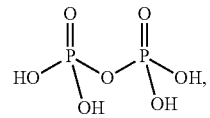

etidronic acid having the structure

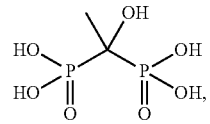

and medronic acid having the structure

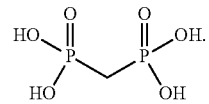

In some embodiments, the phosphorous-containing surface treatment is an organophosphorus acid having the general structure

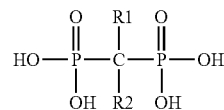

wherein R1 and R2 are independently H, OH, or C1-$C_4$ alkyl group (e.g. methyl or ethyl); or a salt therof.

Figure 3:
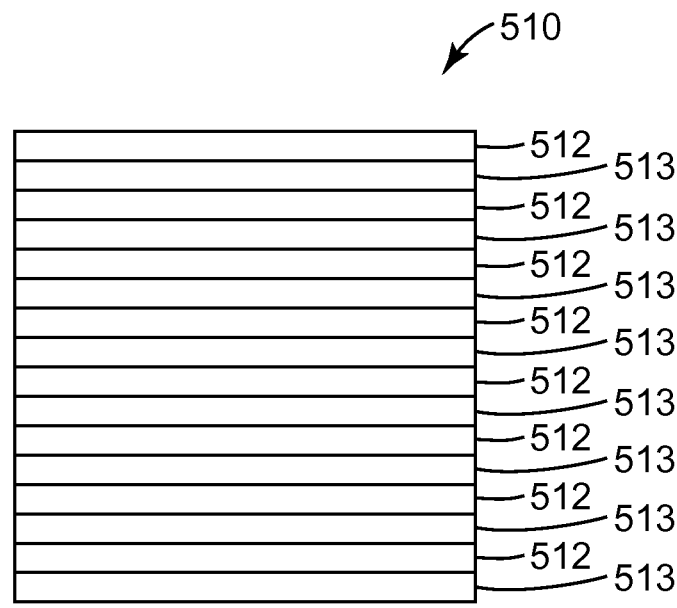
FIG. 3 is a cross sectional view of an embodiment of the plurality of layers deposited by layer-by-layer self-assembly 510.

With reference to FIG. 3, in one embodiment, the plurality of layers 510 deposited by layer-by-layer self-assembly comprises one or more bi-layers comprising a polycation (e.g. polyelectrolyte) monolayer 512 and a polyanion monolayer 513. The polyanion comprises or consists essentially of inorganic oxide nanoparticles having a phosphorous-containing surface treatment, as described herein. In this embodiment, the plurality of layers deposited by layer-by-layer self-assembly comprises a plurality of alternating polymer-inorganic nanoparticle layers. In some embodiments, the polycation is a polyelectrolyte that is not a phosphorous-containing material.

Altering the charge of the (e.g. zirconia) inorganic oxide nanoparticle is also useful for producing a plurality of alternating inorganic oxide nanoparticle layers, in the absence of a polyelectrolyte. With reference to FIG. 3, is this embodiment, the plurality of layers 510 deposited by layer-by-layer self-assembly comprises one or more bi-layers comprising a polycation monolayer 512 wherein the polycation comprises inorganic oxide nanoparticles having positively charged groups on the nanoparticle surface and a monolayer of inorganic nanoparticles having a phosphorous-containing surface treatment 513, as described herein. In this embodiment, the bi-layer or plurality of layers deposited by layer-by-layer self-assembly comprises a plurality of alternating inorganic nanoparticle-inorganic nanoparticle layers.

For example, the (e.g. zirconia) inorganic oxide nanoparticles that are positively charged due to the adsorbed (e.g. acetic) acid that function as polycations can be converted to polyanions wherein the (e.g. zirconia) inorganic oxide nanoparticles comprise negatively charged (e.g. phosphorous-containing) groups. The positively charged (e.g. zirconia) inorganic oxide nanoparticles (e.g. lacking the surface treatement) can be utilized as the polycation. Hence both the polyanion and polycation comprise (e.g. zirconia) inorganic oxide nanoparticles. This can result in bi-layers having high concentration of (e.g. zirconia) inorganic oxide nanoparticles. For example, the concentration of (e.g. zirconia) inorganic oxide nanoparticles of the bi-layer or plurality of bi-layers can be greater than 95%. In this embodiment, the plurality of alternating inorganic oxide nanoparticle layers can consist essentially of (e.g. zirconia) inorganic oxide nanoparticles and the phosphorous-containing surface treatment.

In other embodiments, the plurality of layers 510 deposited by layer-by-layer self-assembly comprise one or more bi-layers that form a high refractive index stack. A low refractive index stack is then alternated with a high refractive index stack. For example, with reference to FIG. 4B, high refractive index stack 111 may comprise bi-layers of 112 that comprise high refractive index inorganic oxide (e.g. zirconia) nanoparticles comprising a phosphorous-containing surface treatment as described herein as a polyanion, and 113, a polymeric polycation such as poly(dially-dimethyl ammonium chloride). In FIG. 4B the illustrative high refractive index stack 111 comprises 8 alternating bi-layers. Low refractive index stack 115 may comprise bi-layers of 116 that comprise low refractive index inorganic oxide nanoparticles, such as $SiO_2$, as a polyanion and 117, a polymeric polycation such as poly(dially-dimethyl ammonium chloride). In FIG. 4B the illustrative low refractive index stack 115 comprises 4 alternating bi-layers. Each stack can be characterized as a high or low refractive index layer comprising a plurality of polymer-inorganic oxide bi-layers.

Various low refractive index nanoparticles can be used in the low refractive index stack such as silica or composite nanoparticles such as core-shell nanoparticles that comprise silica. A core-shell nanoparticle can include a core of an oxide (e.g., iron oxide) or metal (e.g., gold or silver) of one type and a shell of silica deposited on the core. Herein, "silica nanoparticles" refer to nanoparticles that include only silica as well as core-shell nanoparticles with a surface that includes silica. It is appreciated however, that unmodified silica nanoparticles commonly comprise hydroxyl or silanol functional groups on the nanoparticle surface, particularly when the nanoparticles are provided in the form of an aqueous dispersion. Aqueous dispersions of silica nanoparticles can also be ammonium or sodium stabilized. Silica has an isoelectric point at about pH 2 and can thus be used as a polyanion in the layer-by-layer self-assembly process at pH values greater than 2, more preferably at pH values greater than or equal to 3.

Inorganic silica sols in aqueous media are well known in the art and available commercially. Silica sols in water or water-alcohol solutions are available commercially under such trade names as LUDOX (manufactured by E.I. duPont de Nemours and Co., Inc., Wilmington, Del.), NYACOL (available from Nyacol Co., Ashland, Mass.) or NALCO (manufactured by Nalco Chemical Co., Naperville, Ill.). Some useful silica sols are NALCO 1115, 2326, 1050, 2327, and 2329 available as silica sols with mean particle sizes of 4 nanometers (nm) to 77 nm. Another useful silica sol is NALCO 1034a available as a silica sol with mean particle size of 20 nanometers. A useful silica sol is NALCO 2326 available as a silica sol with mean particle size of 5 nanometers. Additional examples of suitable colloidal silicas are described in U.S. Pat. No. 5,126,394 (Revis et al.).

Suitable polyelectrolytes include polycationic polymers (i.e. polycations) such as linear and branched poly(ethyl-eneimine), poly(allylamine hydrochloride), polyvinylamine, chitosan, polyaniline, polypyrrole, polyamidoamine, poly (vinylbenzyltriamethylamine), polydiallyldimethylammonium chloride, poly(dimethylaminoethyl methacrylate), and poly(methacryloylamino)propyl-trimethylammonium chloride. Suitable polyanionic polymers include, but are not limited to, poly(vinyl sulfate), poly(vinyl sulfonate), poly (acrylic acid), poly(methacrylic acid), poly(styrene sulfonate), dextran sulfate, heparin, hyaluronic acid, carrageenan, carboxymethylcellulose, alginate, sulfonated tetrafluoroethylene based fluoropolymers such as Nafion®, poly(vinylphosphoric acid), and poly(vinylphosphonic acid).

The molecular weight of the polyelectrolyte can vary, ranging from about 1,000 g/mole to about 1,000,000 g/mole. In some embodiments, the molecular weight (Mw) of the polyelectrolyte ranges from 50,000 g/mole to 100,000 g/mole.

The plurality of layers deposited by layer-by-layer self-assembly may optionally further comprise an organic light absorbing compound, an organic light stabilizing compound, or a combination thereof dispersed within and preferably covalently bonded to a polyelectrolyte, as described in 61/829332, filed May 31, 2013; incorporated herein by reference.

The concentration of inorganic nanoparticles is typically at least 30 wt.-% of the dried bi-layer, high or low refractive index stack, or totality of self-assembled polymer-nanoparticle layers. The concentration of inorganic nanoparticles is typically no greater than about 80, 85, 90, or 95 wt.-%. The concentration of inorganic nanoparticles can be determined by methods known in the art, such as thermogravimetric analysis. In some embodiments, the dried low refractive index stack, high refractive index stack, or totality of self-assembled polymer-nanoparticle layers comprises at least 50, 55, 60, 65, or 70 wt.-% of inorganic nanoparticles.

The thickness of a bi-layer and the number of bi-layers are selected to achieve the desired (e.g. optical, barrier, or protection) properties, typically using the minimum total thickness of self-assembled layers and/or the minimum number of layer-by-layer deposition steps. In some embodiments, the thickness of a bi-layer, the number of bi-layers per stack, the number of stacks, and the thickness of each stack are selected to achieve the desired optical properties using the minimum total thickness of self-assembled layers and/or the minimum number of layer-by-layer deposition steps. The thickness of each bi-layer typically ranges from about 1 nm to 100 nm. The number of bi-layers per stack typically ranges from about 1 to 200. In some embodiments, the number of bilayers per stack is at least 2, 5, 10, 20, or 30. The number of stacks is typically at least 1, 2, 3, or 4 and no greater than 20, 19, 18, 17, or 15. The thickness of a stack is typically at least 25 nm, 35 nm, 45 nm, 55 nm, 65 nm, 75 nm, or 85 nm and no greater than 5, 6, 7, 8, 9, or 10 microns. In some embodiments, the thickness of a stack is no greater than 500 nm, 400 nm, 300 nm, 250 nm, 200 nm, or 150 nm. In other embodiments, the number of bi-layers is selected to achieve the desired transmission in combination with mechanical durability. In this embodiment, the thickness of a bi-layer and number of bi-layers may approach the maximum values. Further, this embodiment may utilize a single stack of low or high refractive index that may be index matched to the substrate or coating to which it is applied.

The plurality of layers deposited by layer-by-layer self-assembly may provide a durable (e.g. index matched) top coat (e.g. hardcoat), a barrier layer, antireflection, or reflectivity of certain bandwidths of electromagnetic radiation.

The substrate 550 is typically a (e.g. non-porous) plate or continuous film having a thickness of at least 20, 30, 40, or or 50 microns to 1, 2, 3, 4, or 5 cm. In more typical embodiments, the thickness of the substrate is no greater than 30, 20, or 10 mm. Further, thinner substrates may be employed for embodiments wherein the substrate is reinforced by a carrier such as a removable release liner.

In some embodiments, substrate 550 is an inorganic substrate, such as glass. In other embodiments, substrate 550 is an organic material.

In some favored embodiments, substrate 550 comprises an organic material, such as an organic polymeric film. Suitable organic (e.g. film) polymeric materials include homopolymers, copolymers, blends, multilayer films, and multilayer laminates of any polymeric materials including for example polyester (e.g., polyethylene terephthalate, polybutylene terephthalate, and polyethylene napthalate), polycarbonate, allyldiglycol carbonate, acrylics (e.g., polymethylmethacrylate (PMMA)), polystyrene, polysulfone, polyether sulfone, homo-epoxy polymers, epoxy addition polymers with polydiamines and/or polydithiols, polyamides (e.g., nylon 6 and nylon 6,6), polyimides, polyolefins (e.g., polyethylene and polypropylene), olefinic copolymers (e.g., polyethylene copolymers), polyurethanes, polyureas, cellulose esters (e.g., cellulose acetate, cellulose triacetate, and cellulose butyrate), fluoropolymers, and combinations thereof.

Figure 2:
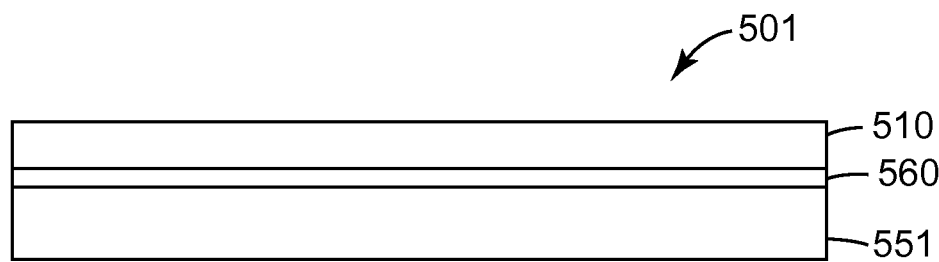
FIG. 2 is a cross sectional view of an illustrative article 501 comprising a substrate 551 including a coating 560 and a plurality of layers deposited by layer-by-layer self-assembly 510, disposed on coating 560.

Another example of a substrate comprising an organic material is depicted in FIG. 2. In this embodiment, substrate 551 may comprise an organic material or may consist of an inorganic material, such as glass or metal. Substrate 551 further comprises an organic polymeric coating 560. In this embodiment, the plurality of layers deposited by layer-by-layer self-assembly 510 are disposed onto the polymeric coating 560. The polymeric coating 560 typically has a thickness of at least 5 or 10 microns and may range up to 100 microns.

Inorganic substrates include for example insulators/dielectrics, semiconductors, or conductors. Inorganic substrates (e.g. dielectrics) can be amorphous or crystalline and include, for example, glass (e.g. float glass, soda lime glass, borosilicate glass), quartz, fused quartz, sapphire, yttria, and other transparent ceramics. Inorganic substrates (e.g. semiconductors) include for example silicon, germanium, Group III/Group V semiconductors (e.g. gallium arsenide) Group II/VI semiconductors, Group IV/VI semiconductors, or Group IV semiconductors (e.g. silicon carbide). Inorganic substrates (e.g. conductors) include for example transparent conductive oxides (TCOs) such as indium-doped tin oxide (ITO), fluorine-doped tin oxide (FTO), and aluminum-doped zinc oxide (AZO) or metals such as gold, silver, aluminum, copper, iron, or alloys such as stainless steel.

The polymeric coating 560 can comprise any of the previously described organic polymeric materials. The polymeric coating can be aqueous-based, solvent-based, or a radiation curable (e.g. 100% solids) coating comprising a polymerizable resin. The polymerizable resin may comprises various (meth)acryl monomer and/or oligomers. The polymeric coating can comprise conducting polymers (e.g. polyaniline or poly(3,4 ethylenedioxythiophene): poly(styrene sulfonate)). The polymeric coating could also be filled with nano- or microparticles of inorganic material (e.g. inorganic oxides such as nanosilica, clay, etc.). The polymeric coating can be, for example, a protective coating, a structural coating, a hardcoat, an anti-reflection coating, or a selectively reflective coating (e.g. visible reflector, UV reflector, IR reflector, or combination thereof).

The layer-by-layer self-assembled polymer-inorganic oxide nanoparticle layers can provide a durable protective topcoat for a substrate. In this embodiment, the layer-by-layer self assembled stack may comprise a low or high refractive index stack, index matched to the substrate or coated surface thereof. Layer-by-layer self-assembled coatings with improved mechanical strength and wear resistance have been taught in U.S. Pat. No. 8,277,899 (Krogman et al.) and WO 2012/112624 (Olmeijer et al.)

In some embodiments, the selection of the inorganic materials will depend upon the reflection bandwidth of interest. For example, the plurality of layers deposited by layer-by-layer self-assembly can be a ¼ wave stack wherein control of the spectrum is achieved by controlling the thickness of the high and low refractive index stacks by altering the number of deposited bi-layers and/or altering the conditions during the layer-by-layer self-assembly process such as the pH and ionic strength of the liquid (e.g. bath) solutions. It is appreciated that the plurality of layers deposited by layer-by-layer self-assembly typically does not utilize birefringence for creating a refractive index difference between the low refractive and high refractive index stacks.

In some embodiments, the plurality of layers deposited by layer-by-layer self-assembly is light transmissive to visible light (400 to 700 nm), typically exhibiting i.e. at least 85% or 90% transmission for polymer-polymer layers and at least 70 or 75% for polymer-inorganic oxide nanoparticle layers. In some embodiments, the substrate is light transmissive to visible light (400 to 700 nm), typically exhibiting i.e. at least 85% or 90% transmission.

In one embodiment, the layer-by-layer self-assembled polymer-inorganic oxide nanoparticle layers can provide an antireflective coating for the substrate. The inclusion of the layer-by-layer self-assembled layers can reduce the surface reflections and thus increase transmission by 1, 2, 3, 4, or 5%.

The physical principles of antireflection films and coatings are known. AR films are often constructed of alternating high and low refractive index ("RI") polymer layers of the correct optical thickness. With regards to visible light, this thickness is on the order of one-quarter of the wavelength of the light to be reflected. The human eye is most sensitive to light around 550 nm. Therefore it is desirable to design the low and high index coating thicknesses in a manner that minimizes the amount of reflected light in this optical range (e.g. 3%, 2%, 1% or lower). In some embodiments, the inclusion of the antireflective coating described herein reduces the average % reflection for 400 to 700 nm by at least 1, 2, 3, or 4%. Further the % reflection at 550 nm may be reduced by at least 1, 2, 3, or 4% as compared to the same substrate lacking the antireflective layer-by-layer coating. An antireflective coating can be created by coating $SiO_2$ containing bi-layers at an optical thickness of ¼ wave. In other embodiments, the antireflective coating comprises at least one low refractive index bi-layer stack and at least one high refractive index bi-layer stack.

In some embodiments, the layer-by-layer self-assembled polymer-inorganic oxide nanoparticle layers may be selected to reflect a desired bandwidth. The plurality of layers deposited by layer-by-layer self-assembly function as a UV mirror, blue mirror, visible mirror, near infrared mirror, or combination thereof. Such self-assembled layers can be one-quarter wave stacks or non-quarter wave stack such as described in Kurt et al, US2010/0290109.

Figure 9:
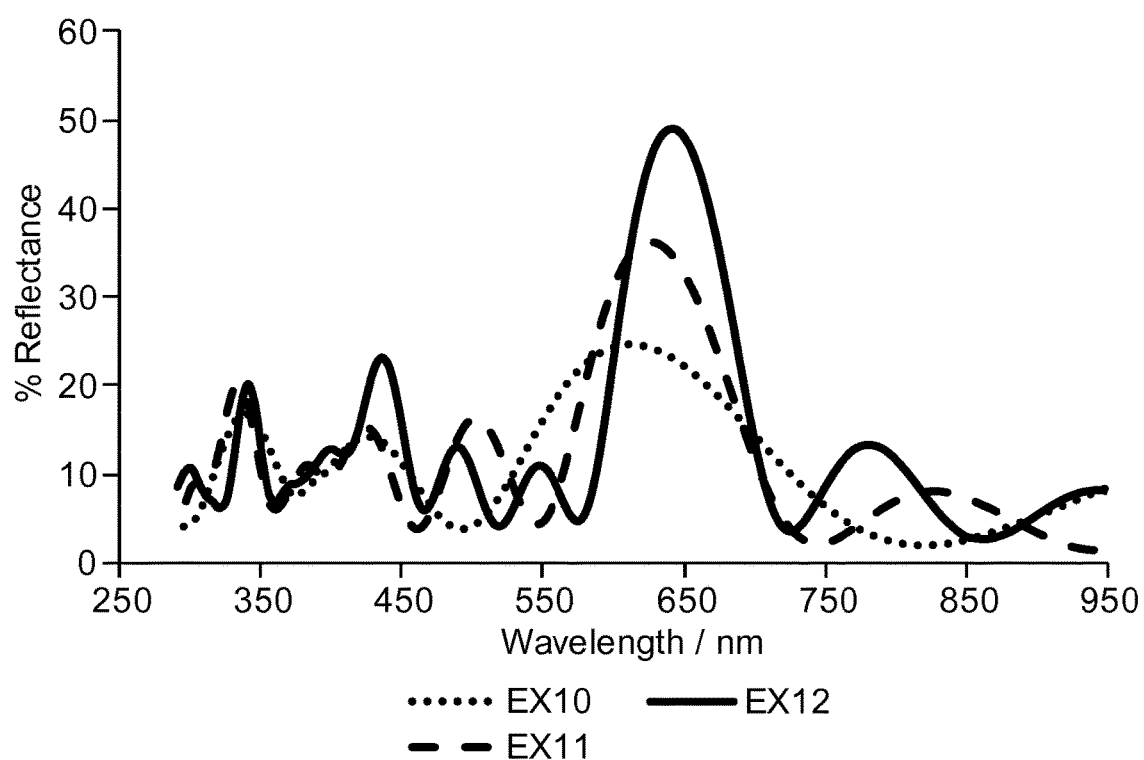
FIG. 9 is the reflectance spectra of the layer-by-layer self-assembled coatings of Examples 10-12.

For example, FIG. 9 depicts a visible light mirror provided on a transparent glass substrate. The peak reflection is within the visible light spectrum. One of ordinary skill in the art appreciate that glass has a reflectivity in air from a single surface of about 4%. However, the presence of visible light mirror increases the reflectivity at a bandwidth of 600-650 nm of at least 10, 15, 20, 25, 30, 35, 40, 45, or 50%. Increasing the number of alternating high and low stacks can increase the reflectivity at a bandwidth of 600-650 nm to 90% or greater. The bandwidth range of the peak can be modified by changing the thickness of the optical stack as known in the art.

Figure 4:
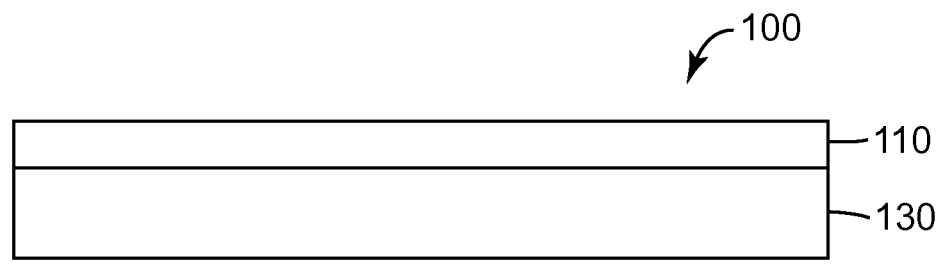
FIG. 4 is a cross sectional view of an illustrative article 100 comprising a multilayer optical film 130 and a plurality of layers deposited by layer-by-layer self-assembly 110, disposed on multilayer optical film 130.

With respect to FIG. 4, in one embodiment, the present invention concerns multilayer optical film (MOF) substrates, wherein a plurality of layers 110 deposited by layer-by-layer self-assembly is disposed on multilayer optical film 130 and at least a portion of the layers comprise an organic light absorbing compound or organic light stabilizing compound dispersed within a polyelectrolyte. In some embodiments, the plurality of layers 110 deposited by layer-by-layer self-assembly forms a major surface layer that is exposed to the environment.

Multilayer optical films include a film having two or more layers. Multilayer optical films are useful, for example, as highly efficient mirrors and/or polarizers.

Various multilayer optical films are known. Multilayer optical films generally comprise alternating polymeric layers of at least one birefringent polymer (e.g. oriented semi-crystalline polymer) and one second polymer, the layers selected to achieve the reflection of a specific bandwidth of electromagnetic radiation.

Figure 4A:
FIG. 4A is a cross sectional view of an illustrative multilayer optical film 130.
Figure 4B:
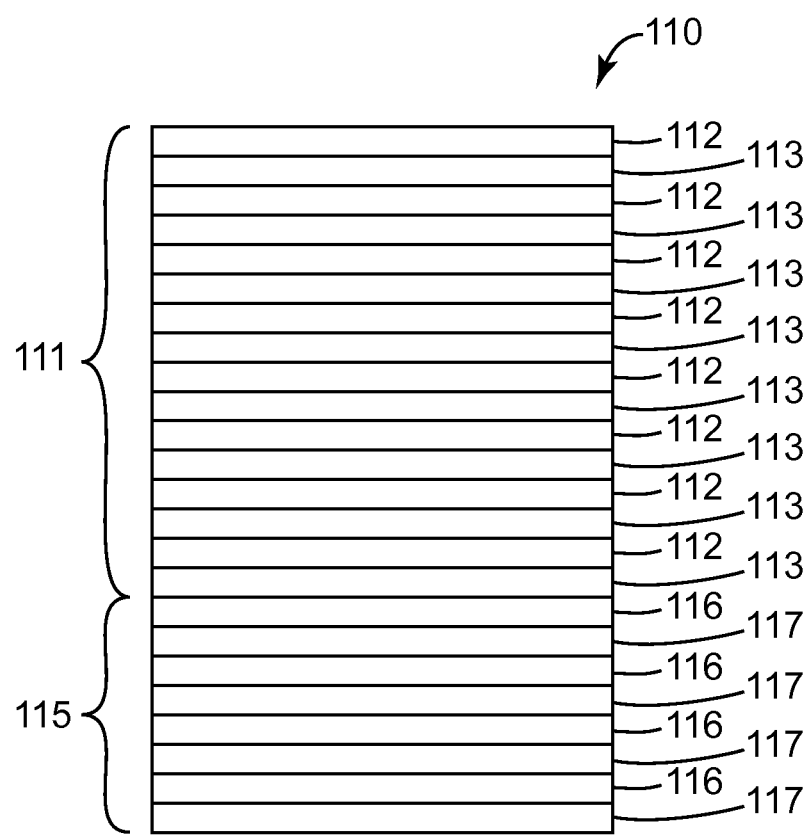
FIG. 4B is a cross sectional view of the plurality of layers deposited by layer-by-layer self-assembly 110.

FIG. 4A shows a multilayer polymer film 130 that may be used, for example, as an optical polarizer or mirror. The film 16 includes one or more first optical layers 12, one or more second optical layers 14, and optionally one or more (e.g. non-optical) additional layers 18. FIG. 4A includes a multilayer stack having alternating layers 12, 14 of at least two materials. In one embodiment, the materials of layers 12 and 14 are polymeric. An in-plane index of refraction $n_1$ in one in-plane direction of high refractive index layer 12 is higher than the in-plane index of refraction $n_2$ of low refractive index layer 14 in the same in-plane direction. The difference in refractive index at each boundary between layers 12, 14 causes part of the incident light to be reflected. The transmission and reflection characteristics of multilayer film 16 is based on coherent interference of light caused by the refractive index difference between layers 12, 14 and the thicknesses of layers 12, 14. When the effective indices of refraction (or in-plane indices of refraction for normal incidence) differ between layers 12, 14, the interface between adjacent layers 12, 14 forms a reflecting surface. The reflective power of the reflecting surface depends on the square of the difference between the effective indices of refraction of the layers 12, 14 (e.g., $(n_1-n_2)^2$). By increasing the difference in the indices of refraction between the layers 12, 14, improved optical power (higher reflectivity), thinner films (thinner or fewer layers), and broader bandwidth performance can be achieved. The refractive index difference in one in-plane direction in an exemplary embodiment is at least about 0.05, preferably greater than about 0.10, more preferably greater than about 0.15 and even more preferably greater than about 0.20.

In one embodiment, the materials of layers 12, 14 inherently have differing indices of refraction. In another embodiment, at least one of the materials of the layers 12, 14 has the property of stress induced birefringence, such that the index of refraction (n) of the material is affected by the stretching process. By stretching multilayer film 16 over a range of uniaxial to biaxial orientations, films can be created with a range of reflectivities for differently oriented plane polarized incident light.

The number of layers is typically at least 10, 25, 50 or 100. In favored embodiments, the number of layers in multilayer film 16 is selected to achieve the desired optical properties using the minimum number of layers for reasons of film thickness, flexibility and economy. In the case of reflective films such as polarizers and mirrors, the number of layers is preferably less than about 2,000, more preferably less than about 1,000, and even more preferably less than about 750. In some embodiments, the number of layer is at least 150 or 200. In other embodiments, the number of layer is at least 250.

In some embodiments, the multilayer polymer film further comprises optional additional non-optical or optical layers. The additional layers 18 are polymer layers that are disposed within the film 16. Such additional layers may protect the optical layers 12, 14 from damage, aid in the co-extrusion processing, and/or to enhance post-processing mechanical properties. The additional layers 18 are often thicker than the optical layers 12, 14. The thickness of the additional (e.g. skin) layers 18 is usually at least two times, preferably at least four times, and more preferably at least ten times, the thickness of the individual optical layers 12, 14. The thickness of the additional layers 18 may be varied to make a multilayer polymer film 16 having a particular thickness. A tie layer (not shown) may be present between the non-optical skin layer and the optical layers. Further, a top coat (also not shown) may be disposed upon the skin layer. Typically, one or more of the additional layers 18 are placed so that at least a portion of the light to be transmitted, polarized, and/or reflected by the optical layers 12, 14, also travels through the additional layers (i.e., the additional layers are placed in the path of light which travels through or is reflected by the optical layers 12, 14).

One embodiment of multilayer film 16 comprises multiple low/high index pairs of film layers, wherein each low/high index pair of layers has a combined optical thickness of ½ the center wavelength of the band it is designed to reflect. Stacks of such films are commonly referred to as quarterwave stacks. For multilayer optical films concerned with the visible and the near infrared wavelengths, a quarterwave stack design results in each of the layers 12, 14 in the multilayer stack having an average thickness of not more than about 0.5 micrometers. In other exemplary embodiments, different low/high index pairs of layers may have different combined optical thicknesses, such as where a broadband reflective optical film is desired.

Asymmetric reflective films (such as films resulting from unbalanced biaxial stretching) may be desirable for certain applications. In that case, average transmission along one stretch direction may be desirably less than, for example, about 50 percent, while the average transmission along the other stretch direction may be desirably less than, for example, about 20 percent, over a bandwidth of, for example, the visible spectrum (about 380-750 nm), or over the visible spectrum and into the near infrared (e.g., about 380-850 nm).

Multilayer optical films can also be designed to operate as reflective polarizers. One way to produce a multilayer reflective polarizer is to uniaxially stretch a multilayer stack. The resulting reflective polarizers have high reflectivity for light with its plane of polarization parallel to a first in-plane axis (usually, in the stretch direction) for a broad range of angles of incidence, and simultaneously have low reflectivity and high transmissivity for light with its plane of polarization parallel to a second in-plane axis that is orthogonal to the first in-plane axis (usually, in the non-stretch direction) for a broad range of angles of incidence. By controlling the three indices of refraction of each film, $n_x$, $n_y$, and $n_z$, the desired polarizer behavior can be obtained. See, for example, U.S. Pat. No. 5,882,774 (Jonza et al.).

The first optical layer(s) are prepared from a birefringent polymer having an in-plane birefringence (the absolute value of $n_x$-$n_y$) after orientation of at least 0.10 and preferably at least 0.15. In some embodiments the birefringence of the first optical layer is 0.20 or greater. The refractive index of the polyester for 632.8 nm light polarized in a plane parallel to the stretch direction can increase from about 1.62 to as high as about 1.87. For other types of multilayer optical films, such as those utilized as a mirror film, the out-of-plane birefringence properties are of importance. In some embodiments, the average out-of-plane birefringence is at least 0.10, at least 0.15 or at least 0.20.

The optical layers 12, 14 and the optional additional layers 18 of the multilayer polymer film 16 are typically composed of polymers such as polyesters. Polyesters include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. The properties of a polymer layer or film vary with the particular choice of monomer molecules of the polyester.

Various suitable polyester polymers have been described in the art, some of which are described in WO2014/099367; incorporated herein by reference in its entirety. An exemplary polymer useful as the birefringent layer in the multilayer optical films of the present invention is polyethylene naphthalate (PEN), which can be made, for example, by reaction of naphthalene dicarboxylic acid with ethylene glycol. Polyethylene 2,6-naphthalate (PEN) is frequently chosen as a birefringent polymer. PEN has a large positive stress optical coefficient, retains birefringence effectively after stretching, and has little or no absorbance within the visible range. PEN also has a large index of refraction in the isotropic state. Its refractive index for polarized incident light of 550 nm wavelength increases when the plane of polarization is parallel to the stretch direction from about 1.64 to as high as about 1.9. Increasing molecular orientation increases the birefringence of PEN. The molecular orientation may be increased by stretching the material to greater stretch ratios and holding other stretching conditions fixed. Copolymers of PEN (CoPEN), such as those described in U.S. Pat. No. 6,352,761 (Hebrink et al.) and U.S. Pat. No. 6,449,093 (Hebrink et al.) are particularly useful for their low temperature processing capability making them more coextrusion compatible with less thermally stable second polymers. Other semicrystalline polyesters suitable as birefringent polymers include, for example, polybutylene 2,6-naphthalate (PBN), polyethylene terephthalate (PET), and copolymers thereof such as those described in U.S. Pat. No. 6,449,093 B2 (Hebrink et al.) or U.S. Pat. App. No. 2006/0084780 (Hebrink et al.), both herein incorporated by reference in their entirety. Alternatively, syndiotactic polystyrene (sPS) is another useful birefringent polymer.

The second polymer of the multilayer optical film can be made from a variety of polymers having glass transition temperatures compatible with that of the first birefringent polymer and having a refractive index similar to the isotropic refractive index of the birefringent polymer. Examples of other polymers suitable for use in optical films and, particularly, in the second polymer include vinyl polymers and copolymers made from monomers such as vinyl naphthalenes, styrene, maleic anhydride, acrylates, and methacrylates. Examples of such polymers include polyacrylates, polymethacrylates, such as poly (methyl methacrylate) (PMMA), and isotactic or syndiotactic polystyrene. Other polymers include condensation polymers such as polysulfones, polyamides, polyurethanes, polyamic acids, and polyimides. In addition, the second polymer can be formed from homopolymers and copolymers of polyesters, polycarbonates, fluoropolymers, and polydimethylsiloxanes, and blends thereof.

In some favored embodiments, the multilayer optical film comprises or consists of quarterwave film stacks. In this case, control of the spectrum requires control of the layer thickness profile in the film stack. A broadband spectrum, such as one required to reflect visible light over a large range of angles in air, still requires a large number of layers if the layers are polymeric, due to the relatively small index differences achievable with polymer films compared to inorganic films. Layer thickness profiles of such films can be adjusted to provide for improved spectral characteristics using the axial rod apparatus taught in U.S. Pat. No. 6,783,349 (Neavin et al.); incorporated herein by reference combined with layer profile information obtained with microscopic techniques.

The multilayer optical film can be an ultraviolet reflector, a blue reflector, a visible reflector, or an infared reflector, as further described in WO2014/099367.

In some embodiments, the multilayer optical film can be characterized as a UV reflective multilayer optical film (i.e. a UV reflector or UV mirror). A UV reflective multilayer optical film refers to a film having a reflectivity at normal incidence of at least 50, 60, 70, 80, or 90% for a bandwidth ranging from 290 nm to 400 nm. In some embodiments, the reflectivity at normal incidence for a bandwidth ranging from 290 nm to 400 nm is at least 91, 92, 93, 94, 95, 96, 97, or 98%. A UV reflective multilayer optical film can have low reflectivity and high transmission for visible light. For example the transmission of visible light can be at least 85% or 90%.

In some embodiments, the multilayer optical film can be characterized as a UV-blue reflective multilayer optical film (i.e. a UV-blue reflector or UV-blue mirror). A UV-blue reflective multilayer optical film refers to a film having a reflectivity at normal incidence of at least 50, 60, 70, 80, or 90% for a bandwidth ranging from 350 nm to 490 nm. In some embodiments, the reflectivity at normal incidence for a bandwidth ranging from 350 nm to 490 nm is at least 91, 92, 93, 94, 95, 96, or 97%. The UV-blue reflective multilayer optical film can have low reflectivity and high transmission for visible light having wavelength greater than 500 nm. For example the transmission of visible light having wavelength greater than 500 nm can be at least 85% or 90%.

In some embodiments, the multilayer optical film can be characterized as a near infrared reflective multilayer optical film (i.e. near infrared reflector or near infrared mirror). A near infrared reflective multilayer optical film refers to a film having a reflectivity at normal incidence of at least 50, 60, 70, 80, or 90% for a bandwidth ranging from 870 nm to 1100 nm. In some embodiments, the reflectivity at normal incidence for a bandwidth ranging from 870 nm to 1100 nm is at least 91, 92, 93, or 94%. In some embodiments, the film exhibits this same near infrared reflectivity at a 45 degree angle. The near infrared reflective multilayer optical film can have low reflectivity and high transmission for visible light. For example the transmission of visible light can be at least 85%, 86%, 87% or 88%.

A visible light reflective multilayer optical film (e.g. visible reflector or visible mirror) refers to a film having a reflectivity at normal incidence of at least 50, 60, 70, 80, or 90% for a bandwidth ranging from 400 nm to 700 nm. In some embodiments, the reflectivity at normal incidence for a bandwidth ranging from 400 nm to 700 nm is at least 91, 92, 93, 94, 95, 96, 97, or 98%. The near infrared reflectivity properties of such broadband reflector are as previously described.

In other embodiments, a single multilayer optical film can reflect more than one bandwidth and may be considered a broadband reflector. For example, the multilayer optical film may be a visible and near infrared reflective multilayer optical film. Thus, such multilayer optical film has high reflectivity of both visible and near infrared bandwidths.

Additionally, two or more multilayer optical film mirrors, e.g. with different reflection bands, laminated together to broaden the reflection band. For example, a multilayer optical film visible reflector, such as previously described, can be combined with a UV, a UV-blue, and/or near infrared reflector. Various other combinations can be made as appreciated by one of ordinary skill in the art.

In some embodiments, the plurality of layers deposited by layer-by-layer self-assembly reflects at least a portion of the same bandwidth of electromagnetic radiation as the multilayer optical film. For example the plurality of layers deposited by layer-by-layer self-assembly can increase the average reflectivity (e.g. for visible light) from about 10% to 20, 30, or 35%.

In other embodiments, the plurality of layers deposited by layer-by-layer self-assembly reflects at least a portion of a different bandwidth of electromagnetic radiation than the multilayer optical film. For example, the inclusion of the plurality of layers deposited by layer-by-layer self-assembly can increase the average reflectivity (e.g. for UV light) from about 35% to 40, 45, or 50%. In yet another embodiment, the inclusion of the plurality of layers deposited by layer-by-layer self-assembly can increase the average reflectivity (e.g. for 290-400 nm) from about 15% to 30, 35, 40, or 45%.

The (e.g. MOF) substrate may optionally include a (e.g. durable) protective top coat as one type of organic polymeric coating that can further contribute to preventing premature degradation due to exposure to light. It is appreciated that the layer that was formerly the "top coat" of the substrate becomes an intermediate layer after the plurality of self-assembled layers are disposed upon the substrate.

The (e.g. durable) protective topcoat, also referred to as a hardcoat, can be abrasion and impact resistant and does not interfere with the primary function of reflecting a selected bandwidth of electromagnetic radiation. Top coat layers may include one or more of the following non-limiting examples, PMMA/PVDF blends, thermoplastic polyurethanes, curable polyurethanes, CoPET, cyclic olefin copolymers (COC's), fluoropolymers and their copolymers such as polyvinylidene fluoride (PVDF), ethylene tetrafluoroethyelene (ETFE), fluorinated ethylene propylene (FEP), and copolymers of tetrafluoroethylene, hexafluoropropylene, and vinylidene fluoride (THV), thermoplastic and curable acrylates, cross-linked acrylates, cross-linked urethane acrylates, cross-linked urethanes, curable or cross-linked polyepoxides, and silicone polyoxamide. Strippable polypropylene copolymer skins may also be employed. Alternatively, silane silica sol copolymer hard coating can be applied as a durable top coat to improve scratch resistance.

The thickness of the top coat is dependent upon an optical density target at specific wavelengths as calculated by Beer's Law. In some embodiments, the top coat has an optical density greater than 3.5 at 380 nm; greater than 1.7 at 390; and greater than 0.5 at 400 nm. Typical protective layer thicknesses are from 0.5 to 15 mils.

The top coat can also comprise various (polymerizable or unpolymerizable) additives such as light absorbers (UVA) that comprise a benzotriazole, benzophenone, or triazine group, hindered amine light stabilizers (HALS) and combinations thereof in amounts ranging from about 2-10%. Such UVA absorbers are the same classes of compounds previously described except that the inclusion of a (meth)acryl or vinyl group is optional.

The top coat can comprise inorganic oxide nanoparticles, such as non-pigment zinc oxide and titanium oxide, as light blocking or scattering additives. For example, nano-scale particles can be dispersed in polymer or coating substrates to minimize UV radiation degradation. The nano-scale particles are transparent to visible light while either scattering or absorbing harmful UV radiation thereby reducing damage to thermoplastics. The concentration of such inorganic oxide nanoparticles is typically less than 5, 4, 3, 2, or 1 wt.-%.

It is within the scope of the present disclosure to include UV protective topcoats on both major surfaces of a (e.g. MOF) substrate. In some embodiments, it may be desirable to have a UV protective topcoat only between the substrate and the plurality of layers deposited by layer-by-layer self-assembly or only on the opposite surface as the plurality of layers deposited by layer-by-layer self-assembly.

Optional UV protective hardcoats can be provided by techniques known in the art, including those described in U.S. Pat. No 7,153,588 (McMan et al.) and WO2013/142239 (Clear et al.). Additional hard coats include silica filled siloxanes available, for example, from California Hard Coat (San Diego, Calif.) under the trade designation "PERMANEW", and from Momentive Performance Materials (Albany, N.Y.) under the trade designations "AS4000", "AS4700", and "UVHC-3000". Exemplary acrylic UV protective hardcoats are available, for example, under the trade designations "UVT610(GEN IV)" and "UVT200" from Red Spot Paint & Varnish Company (Evansville, Ind.). Exemplary UV protective acrylic hard coats are disclosed, for example, in WO2013/142239. Use of hardcoats can, for example, reduce or prevent premature degradation of the article due to exposure to outdoor elements. The hardcoat is generally abrasion and impact resistant and does not interfere with the primary function of reflecting a selected bandwidth of electromagnetic radiation.

However, since the plurality of layer-by-layer self-assembled layers can minimize UV radiation degradation by reflecting UV radiation, in some embodiments, the substrate (inclusive of the optional layer(s)) is free of inorganic oxide particles and may also be free of organic light absorbing or light stabilizing compounds in the organic coating layer (e.g. topcoat when present).

In some embodiments, the substrates and articles are suitable for outdoor usage or other uses wherein the substrate is subject to high levels of exposure to solar radiation. For example, in one embodiment, the substrate may be a light transmissive cover of a light bulb.

In other embodiments, the substrate is an optical film having high transmission of visible light such as a cover (glass or organic) polymeric substrate for an optical display, a (e.g. reflective) polarizing film or a brightness enhancing film suitable for use in various liquid crystal displays (LCD) and light-emitting diode displays (LEDs).

Films having a high transmission of visible light including UV, IR and visible mirrors may also be used in architectural applications, greenhouse applications, window films, paint protection films, solar power applications, lighting, fenestration products (i.e., products that fill openings in a building, such as windows, doors, skylights, or curtain walls, e.g., that are designed to permit the passage of light), solar light tube products and other daylighting systems for transporting sunlight to interior rooms, and other applications.

In other embodiments, the substrates described herein may be used in commercial graphics films (e.g. films for billboards, building exteriors, signage, automobiles, mass transit vehicles, etc.), traffic signage, and protection films such as car wrap films.

In some favored embodiments, the multilayer optical film of the present disclosure is utilized as a broadband reflector for solar concentrators of solar cells of solar power systems.

Figure 5:
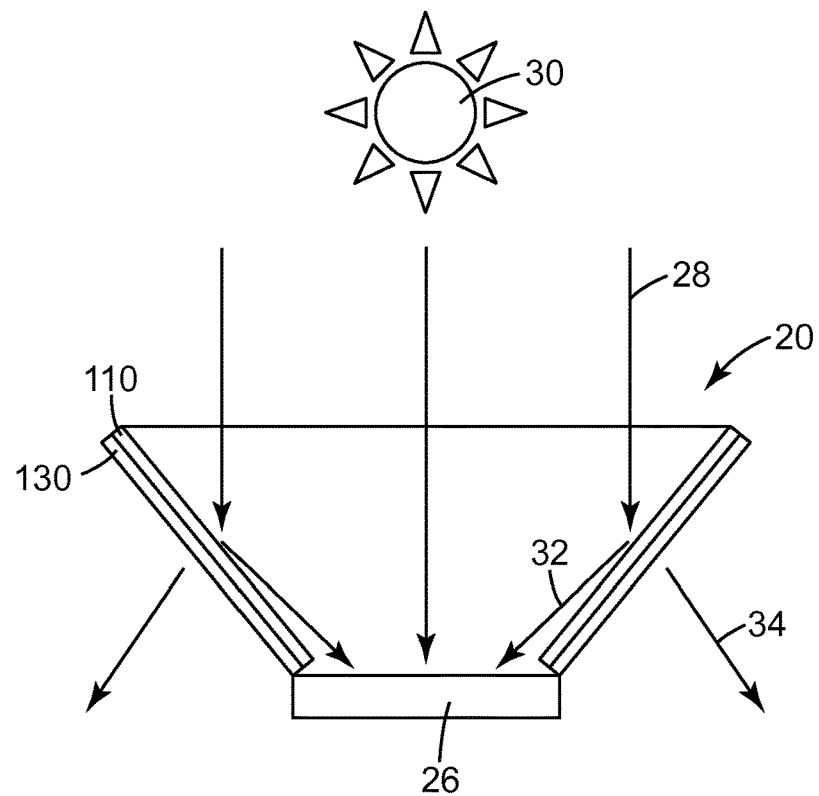
FIG. 5 is a schematic view of a solar cell.

As described for example in US2009/0283144 (Hebrink et al.); incorporated herein by reference, FIG. 5 illustrates a general application of the article 20 as a solar concentrating mirror. Article 20 comprises a multilayer optical film 130 having self-assembled layers 110 positioned in close proximity to a solar cell 26. The article 20 receives electromagnetic radiation 28 from the sun 30. A select bandwidth 32 of the electromagnetic radiation 28 is reflected onto solar cell 26. An undesirable bandwidth 34 of electromagnetic radiation passes through article 20 and is not reflected onto solar cell 26.

Figure 6:
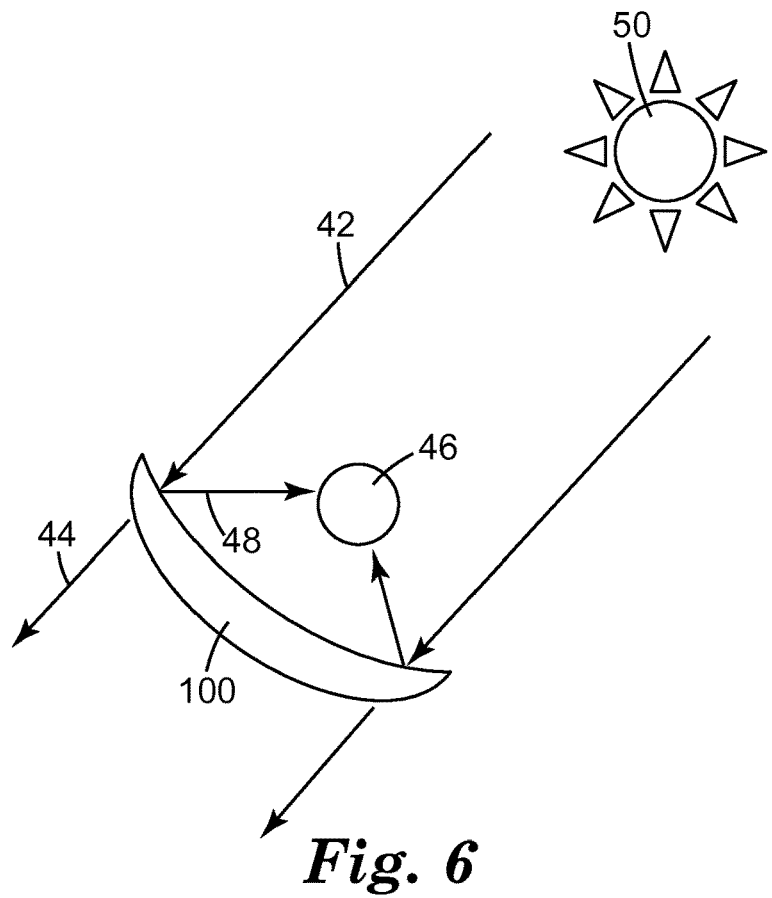
FIG. 6 is a schematic view of another embodiment of a solar cell.

FIG. 6 is another general embodiment depicting the inventive article in the form of a parabolic solar concentrating mirror 100. Electromagnetic radiation 42 from the sun 50 is received by the parabolic solar concentrating mirror 100. A preferred bandwidth 48 is reflected onto a solar cell 46 while an undesirable bandwidth 44 of electromagnetic radiation passes through the parabolic solar concentrating mirror 100 and is not reflected onto the solar cell 46 where it could potentially alter the operational efficiency of the solar cell. The shape of the article may include parabolic or other curved shapes, such as for example sinusoidal.

Figure 7:
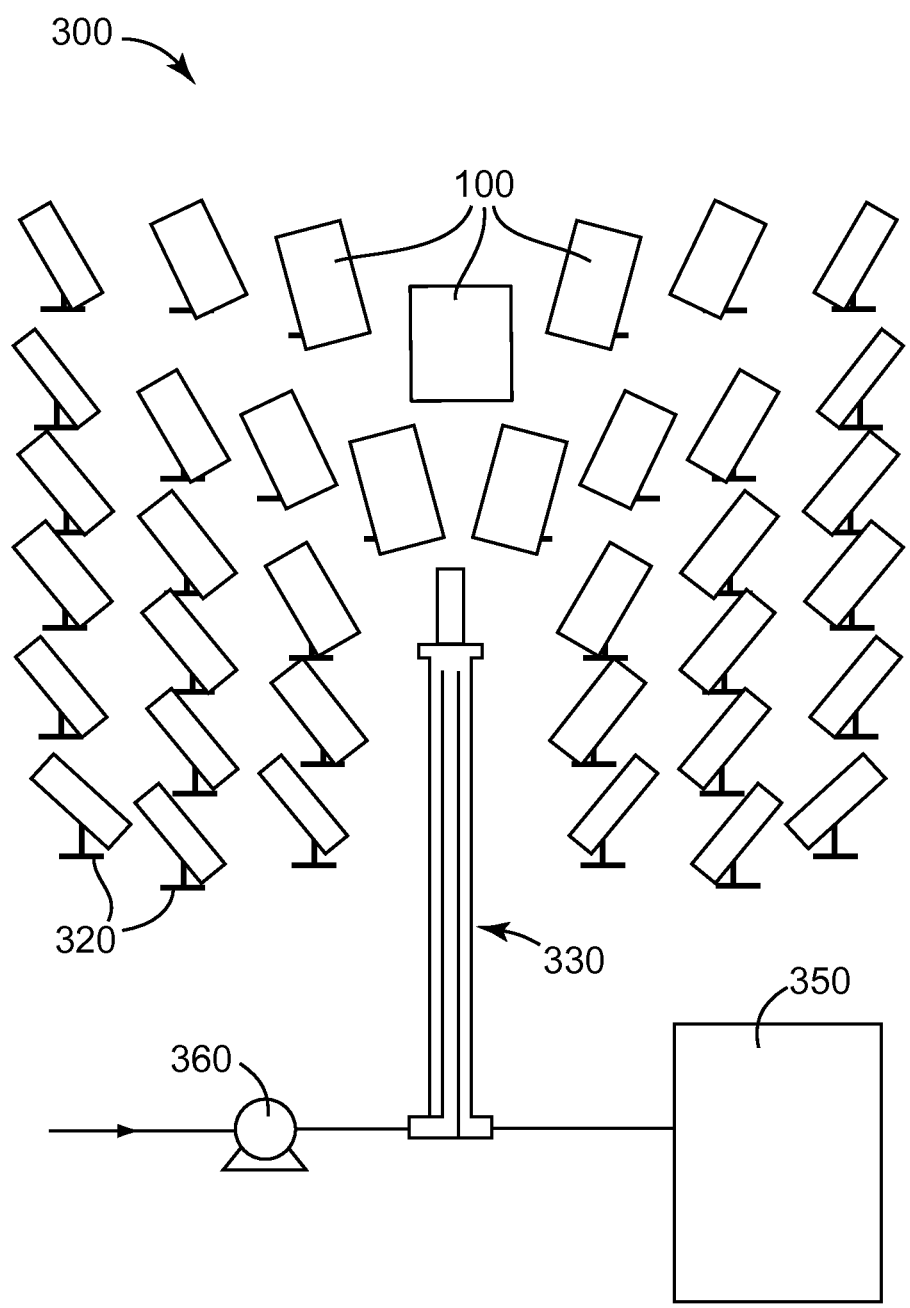
FIG. 7 is a schematic plan view of a concentrated solar power system.

As described for example in US2012/0011850 (Hebrink et al.); incorporated herein by reference, an exemplary concentrated solar power system 300 is depicted schematically in FIG. 7. Concentrated solar power system 300 comprises broadband reflectors 100 connected to celestial tracking mechanism 320 that is capable of aligning direct solar radiation from broadband reflectors 100 onto hollow receiver 330. A heat transfer fluid circulates by means of pump 360 through the hollow receiver 330 where it is heated by concentrated solar radiation. The heated heat transfer fluid is then directed to an electrical generator 350 (e.g., a steam turbine) where the thermal energy is converted to electrical energy. In another embodiment, the heat transfer fluid may be directed to a heat exchanger instead of the electrical generator, where the heat content is transferred to a liquid medium such as, for example, water that is converted to steam which drives the electrical generator.

Figure 8:
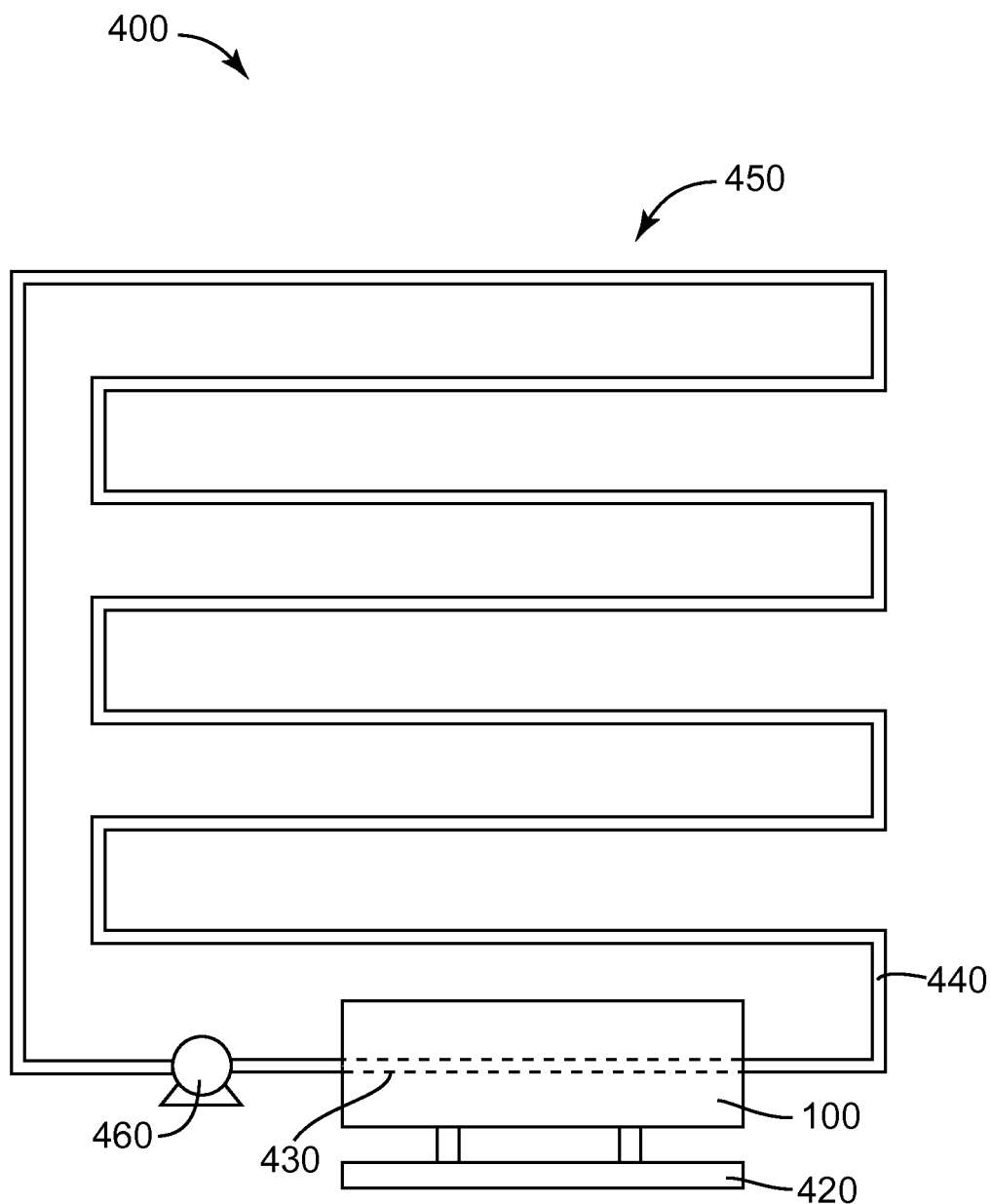
FIG. 8 is a schematic plan view of another embodiment of a concentrated solar power system.

Another exemplary concentrated solar power system 400 is depicted schematically in FIG. 8. Concentrated solar power system 400 comprises parabolic trough-shaped broadband reflectors 100 connected to celestial tracking mechanism 420 that is capable of aligning direct solar radiation from broadband reflectors 100 onto hollow receiver 430. A heat transfer fluid 440 circulates by means of pump 460 through the hollow receiver 430 where it is heated by concentrated solar radiation. The heated heat transfer fluid 440 is then directed to a thermal heating system 450 where the thermal energy is converted to electrical energy.

The hollow receivers may be transparent or opaque and should typically be made of material (e.g., metal or glass) that is capable of withstanding the light and heat directed upon it by the broadband reflectors. Exemplary heat transfer fluids include water, water/glycol mixtures, brine, molten salts, and oils, with the selected typically being dictated by application requirements and cost. Often the hollow receivers comprise an interior pipe coated with a solar absorbing material disposed inside an exterior transparent (e.g., glass) pipe, although other configurations may also be used. In some embodiments, the heated heat transfer fluid flowing through the solar absorbing hollow receiver exchanges heat with water to create steam that drives an electric generator.

Further enhancements in the concentrated solar power system output may be achieved when anti-reflective surface structured films or coatings are applied to the front surface of the hollow receiver. Surface structures in the films or coating typically change the angle of incidence of light such that it enters the polymer and hollow receiver beyond the critical angle and is internally reflected, leading to more absorption by the hollow receiver. Such surface structures can be in the shape, for example, of linear prisms, pyramids, cones, or columnar structures. For prisms, typically the apex angle of the prisms is less than 90 degrees (e.g., less than 60 degrees). The refractive index of the surface structured film or coating is typically less than 1.55 (e.g., less than 1.50). These anti-reflective surface structured films or coatings can be made durable and easily cleanable with the use of inherently UV stable and hydrophobic or hydrophilic materials. Anti-reflective coatings (e.g., nanostructured coatings or low refractive index coatings) could also be applied to the interior glass surface of the hollow receiver. Durability of the anti-reflective coatings or films can be enhanced with the addition of inorganic nano-particles.

Broadband reflectors according to the present disclosure may also be useful, for example, for concentrated photovoltaic systems. For example, a broadband reflector disclosed herein may be useful when placed in proximity to a multi junction GaAs cell, which has an absorption bandwidth from about 350 nm to about 1750 nm, or a mono-crystalline silicon photovoltaic cell having an absorption bandwidth of about 400 nm to about 1150 nm. In some embodiments, a thermal management device (e.g., in the form of ribs, pins, or fins) may be used to dissipate heat from the solar cell.

Advantages and embodiments of this disclosure are further illustrated by the following examples, but the particular materials and amounts thereof recited in these examples, as well as other conditions and details, should not be construed to unduly limit this disclosure. All materials are commercially available or known to those skilled in the art unless otherwise stated or apparent.

EXAMPLES

Materials

Standard soda-lime glass microscope slides were purchased from Fisher Scientific (Pittsburgh, Pa.).

"SPECTRA/POR 7" dialysis membranes were purchased from Spectrum Labs, Inc. (Rancho Dominguez, Calif.) under trade designation "SPECTRA/POR 7".

"HEDP" refers to 1-hydroxyethane 1,1-disphosphic acid obtained from Alfa Aesar (Ward Hill, Mass.) as a 60 wt. % solution in water.

"PDADMAC", refers to poly(diallyl-dimethyl ammonium chloride), a positively charged polymer (i.e., polycationic polymer) with molecular weight 240K, obtained from PolySciences, Inc. Warrington, Pa., as a 20 wt. % aqueous solution.

"PSS" refers to poly(styrene sulfonic acid), a negatively charged polymer (i.e. polyanionic polymer) with molecular weight 70K, obtained from Alfa Aesar, Ward Hill, MA, as a 20 wt % solution in water.

"PAA" refers to polyacrylic acid, a negatively charged polymer with molecular weight 240K, obtained from Alfa Aesar, Ward Hill, Mass., as a 20 wt. % solution in water.

"IPA" refers to 2-propanol, obtained from VWR, West Chester, Pa.

"$SiO_2$" refers to silica nanoparticles (20 nm diameter, sodium stabilized), a negatively charged metal oxide (i.e. polyanionic nanoparticle) obtained from Nalco Company, Naperville, IL, as a 42.5 wt. % aqueous dispersion under the trade designation "NALCO 1050".

Method for Zirconia Nanoparticle Sol Synthesis and Purification:

A zirconia sol was made according to WO2009/085926A2 (Kolb et al.) by hydrolyzing an acetic acid zirconium salt at elevated temperature and pressure. The sol was concentrated via distillation (34.75% solids) and diafiltered to remove excess acetic acid using a membrane cartridge (M21S-100-01P, available from SpectrumLab, Rancho Dominguez, Calif.). The sol was then further concentrated via distillation to 62.51 wt % solids. The final acetic acid content was 1.39 mmol/g $ZrO_2$.

General Method for Making Layer-by-Layer Self-Assembled Coatings

Layer-by-layer coatings were made using a StratoSequence VI (obtained from nanoStrata Inc., Tallahassee, Fla.) dip coating robot. Glass microscope slides were rinsed with IPA and de-ionized (DI) water and dried under a stream of nitrogen. Subsequently, the slides were rinsed thoroughly with DI water to remove weakly bound polymer. The substrates were then alternately dipped in solutions of a polycation (e.g. $ZrO_2$ nanoparticle suspension) for a certain amount of time and a polyanion (e.g. PSS) for a certain amount of time with three rinse steps of 30 sec duration after each charged polymer or nanoparticle solution. The substrates were rotated at about 90 rpm in each bath. After the desired number of layers was deposited, coatings were rinsed with DI water and dried with $N_2$ gas. Coatings are denoted as (Polycation/Polyanion)$_z$ where z is the number of deposited "bilayers". A "bilayer" is defined as as the combination of a polycation layer and a polyanion layer. "Polycation" and "polyanion" can refer to polymeric polycations and polyanions or inorganic metal oxide nanoparticles.

Method for Determining the pH of the Coating Solutions

The pH of the solutions used for coating was determined using a VWR sympHony® rugged bulb pH electrode connected to a VWR sympHony® pH meter. Standard buffer solutions were used for calibration.

Method for Determining Thickness and Refractive Index of Layer-by-Layer Self-Assembled Coatings Coating thickness was determined with spectroscopic ellipsometry using a J.A. Woollam M-2000 variable angle ellipsometer from 300-1500 nm at angles of 50°, 60°, and 70°. First, a bare glass slide was measured and modeled with a two-parameter Cauchy function ($n=A_n+B_n/\lambda^2$). Next, the coated glass slide was measured and the coating was also modeled with a two-parameter Cauchy function ($n=A_n+B_n/\lambda^2$). Keeping the thickness and optical constants of the glass slide constant, coating thickness, $A_n$, and $B_n$ were iteratively varied with WVASE 32 software until the error between the model and experimental data was minimized. To estimate surface roughness, an additional roughness layer was added above the Cauchy layer in the optical model. The roughness layer consists of 50% of the underlying Cauchy material and 50% air (n=1.00).

Method for Determining UV and Visible Reflectance of Samples

The UV and visible reflectance of samples prepared according to the examples described below were measured with a LAMBDA 1050 UV/Vis/NIR Spectrophotometer with an integrating sphere (obtained from PerkinElmer, Inc., Waltham, Mass.). The prepared coatings were removed from the backside of the substrates with a razor blade. For reflection measurements, the backside of the sample was masked with black electrical tape to suppress backside reflections. Measurements were made at a near normal angle of incidence (i.e., 8° deviation from normal).

Preparative Example 1 (PEX1)

Zirconia Nanoparticle Surface Modification Procedure $ZrO_2$ nanoparticles at ~56.3 wt. % were diluted to 1 wt. % with DI water in a volume of 100 mL. Approximately 1.5 mL of 60 wt. % HEDP was added to this suspension with stirring. The suspension initially becomes opaque as the negatively charged HEDP complexed with the positively charged $ZrO_2$; however, the suspension cleared within a few seconds as the HEDP, in sufficient excess, modified the individual $ZrO_2$ particles and formed a stable colloidal suspension, which was denoted as HEDP-$ZrO_2$. This HEDP-$ZrO_2$ suspension was then dialyzed against a 3500 MWCO regenerated cellulose dialysis membrane to remove excess HEDP. The dialysis bath (DI water) had a volume of approximately 4 L and was stirred with a magnetic stir bar. The water was replaced with fresh DI water at least five times with at least 2 hr intervals between changes.

Examples 1-4 (EX1-EX4)

High Refractive Index, "All-nanoparticle" Layer-by-layer Coatings ($ZrO_2$/HEDP-$ZrO_2$)n $ZrO_2$ nanoparticles at ~56.3 wt. % were diluted to 0.1 wt. % with DI water in a volume of 140 mL. HEDP-$ZrO_2$ nanoparticles at ~1 wt. % were diluted to 0.1 wt. % with DI water in a volume of 140 mL. NaCl was added to both suspensions to a concentration of 10 mM. Layer-by-layer self-assembled coatings were prepared on glass microscope slides with a StratoSequence VI as described above. Glass slides were first dipped in the $ZrO_2$ suspension for 15 min and rinsed in three separate DI water rinse baths for 30 sec each. Next, the slides were dipped in the HEDP-$ZrO_2$ suspension for 15 min and then rinsed in three separate DI water rinse baths for 30 sec each. This cycle was repeated to deposit coatings with 5 (EX1), 10 (EX2), 15 (EX3), and 20 (EX4) bi-layers.

Example 5 (EX5)

High Refractive Index, "All-nanoparticle" Layer-by-layer Coatings ($ZrO_2$/HEDP)n $ZrO_2$ nanoparticles at ~56.3 wt. % were diluted to 0.1 wt. % with DI water in a volume of 140 mL. HEDP at 60 wt. % was diluted to 2 wt. % with DI water in a volume of 140 mL.

NaCl was added to the ZrO$_2$ suspension to a concentration of 10 mM. Layer-by-layer self-assembled coatings were prepared on glass microscope slides with a StratoSequence VI as described above. Glass slides were first dipped in the ZrO$_2$ suspension for 15 min and then rinsed in three separate DI water rinse baths for 30 sec each. Next, the slides were dipped in the HEDP suspension for 1 min, then rinsed in three separate DI water rinse baths for 30 sec each. This cycle was repeated to deposit coatings with 20 bi-layers (EX5).

Examples 6-9 (EX6-EX9)

High Refractive Index, (PDADMAC/HEDP-ZrO$_2$) Layer-by-layer Coatings

PDADMAC at 20 wt. % in water was diluted to 0.1 wt % with DI water in a volume of 140 mL. HEDP-ZrO$_2$ nanoparticles at ~1 wt. % were diluted to 0.1 wt. % with DI water in a volume of 140 mL. NaCl was added to the HEDP-ZrO$_2$ suspension to give a concentration of 10 mM. Layer-by-layer self-assembled coatings were prepared on glass microscope slides with a StratoSequence VI as described above. Glass slides were first dipped in the PDADMAC suspension for 1 min and then rinsed in three separate DI water rinse baths for 30 sec each. Next, the slides were dipped in the HEDP-ZrO$_2$ suspension for 15 min and then rinsed in three separate DI water rinse baths for 30 sec each. This cycle was repeated to deposit coatings with 5 (EX6), 10 (EX7), 15 (EX8), and 20 (EX9) bi-layers.

Examples 10-12 (EX10-EX12)

Visible Light Reflecting Coating Based on High Index HEDP-ZrO$_2$ Layers and Low Index SiO$_2$ Layers PDADMAC at 20 wt. % in water was diluted to 0.1 wt. % with DI water in a volume of 140 mL. HEDP-ZrO$_2$ nanoparticles at ~1 wt. % were diluted to 0.1 wt. % with DI water in a volume of 140 mL. SiO$_2$ nanoparticles at 42.5 wt. % were diluted to 0.1 wt. % with DI water in a volume of 140 mL. Sodium carbonate decahydrate and sodium bicarbonate were added to the PDADMAC, HEDP-ZrO$_2$, and SiO$_2$ suspensions to a buffer strength of 10 mM and pH of about 10.

Layer-by-layer self-assembled coatings were prepared on glass microscope slides with a StratoSequence VI as described above. Glass slides were first dipped in the PDADMAC suspension for 1 min, then rinsed in three separate DI water rinse baths for 30 sec each. Next, the slides were dipped in the HEDP-ZrO$_2$ suspension for 15 min and then rinsed in three separate DI water rinse baths for 30 sec each. This cycle was repeated to deposit five bi-layers denoted as (PDADMAC/HEDP-ZrO$_2$)$_5$, which is referred to as a "high index stack" (H). The high index stacks had a thickness of 84.0±1.5 nm and a refractive index of 1.68 at 633 nm.

Next, the slides were dipped in the PDADMAC suspension for 1 min and then rinsed in three separate DI water rinse baths for 30 sec each. Then the slides were dipped in the SiO$_2$ suspension for 15 min and then rinsed in three separate DI water rinse baths for 30 sec each. This cycle was repeated to deposit nine bi-layers denoted as (PDADMAC/SiO$_2$)$_9$, which is referred to as a "low index stack" (L). The low index stacks had a thickness of 117.6±0.9 nm and a refractive index of 1.30 at 633 nm.

A total of three (EX10), five (EX 11), and seven (EX12) stacks were deposited with sequences of HLH, HLHLH, and HLHLHLH, respectively. Samples were dried under a stream of N$_2$ between each stack. The UV/Vis reflectance spectra of the coatings are shown in FIG. 9.

Examples 13-15 (EX13-EX15)

High Refractive Index, (PDADMAC/HEDP-ZrO$_2$) Layer-by-layer Coatings on a Polymer Substrate PDADMAC at 20 wt % in water was diluted to 0.1 wt % with DI water in a volume of 140 mL. HEDP-ZrO$_2$ nanoparticles at ~1 wt % were diluted to 0.1 wt % with DI water in a volume of 140 mL. NaCl was added to the HEDP-ZrO$_2$ suspension to give a concentration of 10 mM. Layer-by-layer self-assembled coatings were prepared on PET (2 mil thick, 3M Company, St. Paul Minn.) with a StratoSequence VI following the "General Method for Making Layer-by-Layer Self-Assembled Coatings" above. However, in the case of the PET substrate, the PET was first rinsed with IPA and DI water, dried under a stream of N$_2$, and air corona treated by hand with a BD-20AC Laboratory Corona Treater (obtained from Electro-Technic Products, Inc., Chicago, Ill.) for approximately 20 seconds per side to improve wetting of the aqueous coating solutions. The PET was first dipped in the PDADMAC suspension for 1 min and then rinsed in three separate DI water rinse baths for 30 sec each. Next, the slides were dipped in the HEDP-ZrO$_2$ suspension for 15 min and then rinsed in three separate DI water rinse baths for 30 sec each. This cycle was repeated to deposit coatings with 10 (EX13), 15 (EX14), and 20 (EX15) bi-layers. Uniform coatings, similar in appearance to those on glass, were observed Comparative Examples 1-6 (CE1-CE6)

Lower Refractive Index ZrO$_2$ Layer-by-layer Coatings with PSS

PSS at 30 wt. % in water was diluted to 0.1 wt. % with DI water in a volume of 140 mL. ZrO$_2$ nanoparticles at ~1 wt. % were diluted to 0.1 wt. % with DI water in a volume of 140 mL. NaCl was added to both suspensions to a concentration of 10 mM. Layer-by-layer self-assembled coatings were prepared on glass microscope slides with a StratoSequence VI as described above. Glass slides were first dipped in the ZrO$_2$ suspension for 15 min and then rinsed in three separate DI water rinse baths for 30 sec each. Next, the slides were dipped in the PSS suspension for 1 min and then rinsed in three separate DI water rinse baths for 30 sec each. This cycle was repeated to deposit coatings with 5 (CE1), 10 (CE2), 15 (CE3), and 20 (CE4) bi-layers.

In addition, increasing amounts of NaCl were added to the ZrO$_2$ to attempt to boost the refractive index of the coatings further. Coatings with 15 bi-layers made with ZrO$_2$ suspensions with 50 mM NaCl (CE5) and 100 mM NaCl (CE6) were fabricated as described above. The presence of 50 mM NaCl increased the refractive index slightly compared to the case of 10 mM NaCl, however at the expense of increased surface roughness. The presence of 100 mM NaCl caused the refractive index to drop relative to the 10 mM and 50 mM NaCl conditions.

Comparative Examples 7-10 (CE7-CE10)

Lower Refractive Index ZrO$_2$ Layer-by-layer Coatings with PAA

PAA at 25 wt. % in water was diluted to 0.1 wt. % with DI water in a volume of 140 mL. ZrO$_2$ nanoparticles at ~1 wt. % were diluted to 0.1 wt. % with DI water in a volume of 140 mL. NaCl was added to both suspensions to a concentration of 10 mM. Layer-by-layer self-assembled coatings were prepared on glass microscope slides with a StratoSequence VI as described above. Glass slides were first dipped in the ZrO₂ suspension for 15 min and then rinsed in three separate DI water rinse baths for 30 sec each. Next, the slides were dipped in the PAA suspension for 1 min and then rinsed in three separate DI water rinse baths for 30 sec each. This cycle was repeated to deposit coatings with 5 (CE7), 10 (CE8), 15 (CE9), and 20 (CE10) bi-layers. Table 1, below, summarizes thickness, surface roughness, and refractive index data for ZrO₂ nanoparticle-containing layer-by-layer self-assembled coatings for EX1-EX9 and CE1-CE10.

| Example | Polycation | Polyanion | # bi-layers | Thickness (nm) | Surface Roughness (nm) | Refractive Index (at 633 nm) |
|---|---|---|---|---|---|---|
| EX1 | ZrO₂ | HEDP-ZrO₂ | 5 | 17.7 | 0 | 1.48 |
| EX2 | ZrO₂ | HEDP-ZrO₂ | 10 | 67.8 | 1.6 | 1.61 |
| EX3 | ZrO₂ | HEDP-ZrO₂ | 15 | 99.3 | 6.0 | 1.65 |
| EX4 | ZrO₂ | HEDP-ZrO₂ | 20 | 154.5 | 6.5 | 1.69 |
| EX5 | ZrO₂ | HEDP | 20 | 55.5 | 12.4 | 1.57 |
| EX6 | PDADMAC | HEDP-ZrO₂ | 5 | 61.0 | 3.3 | 1.54 |
| EX7 | PDADMAC | HEDP-ZrO₂ | 10 | 165.3 | 5.9 | 1.68 |
| EX8 | PDADMAC | HEDP-ZrO₂ | 15 | 546.1 | 5.3 | 1.67 |
| EX9 | PDADMAC | HEDP-ZrO₂ | 20 | 909.1 | 5.7 | 1.68 |
| CE1 | ZrO₂ | PSS | 5 | 27.3 | 0 | 1.37 |
| CE2 | ZrO₂ | PSS | 10 | 56.7 | 6.7 | 1.51 |
| CE3 | ZrO₂ | PSS | 15 | 84.6 | 7.1 | 1.56 |
| CE4 | ZrO₂ | PSS | 20 | 105.1 | 19.2 | 1.56 |
| CE5 | ZrO₂ | PSS | 15 | 132.4 | 24.5 | 1.58 |
| CE6 | ZrO₂ | PSS | 15 | 173.7 | 23.7 | 1.55 |
| CE7 | ZrO₂ | PAA | 5 | 49.9 | 11.1 | 1.27 |
| CE8 | ZrO₂ | PAA | 10 | 101.2 | 20.0 | 1.32 |
| CE9 | ZrO₂ | PAA | 15 | 125.9 | 21.3 | 1.44 |
| CE10 | ZrO₂ | PAA | 20 | 152.2 | 59.5 | 1.42 |

What is claimed is:

1. An article comprising
   a substrate;
   a plurality of layers deposited by layer-by-layer self-assembly disposed on the substrate, where a portion of the layers comprise a polycation and a polyanion and the polyanion comprises inorganic oxide nanoparticles comprising a phosphorous-containing surface treatment.

2. The article of claim 1 wherein the inorganic oxide nanoparticles comprising the phosphorous-containing surface treatment comprise at least two negatively charged groups.

3. The article of claim 1 wherein the plurality of layers have a refractive index of at least 1.60.

4. The article of claim 3 wherein the inorganic oxide nanoparticles comprise titania, zirconia, alumina, antimony oxide, ceria, zinc oxide, lanthanum oxide, tantalum oxide, mixed metal oxides thereof, and mixtures thereof.

5. The article of claim 4 wherein the inorganic oxide nanoparticles comprise zirconia.

6. The article of claim 1 wherein the phosphorous-containing surface treatment is a phosphorous-containing acid or salt thereof.

7. The article of claim 1 wherein the phosphorous-containing surface treatment is an organophosphorous acid or salt thereof.

8. The article of claim 1 wherein the phosphorous-containing surface treatment comprises at least two negatively charged groups.

9. The article of claim 8 wherein at least one of the negatively charged groups is a negatively charged phosphorous-containing group.

10. The article of claim 1 wherein the phosphorous-containing surface treatment is an acid having the general structure

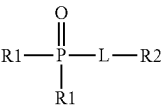

wherein L is oxygen or an alkylene group optionally substituted with OH groups; or L-R2 is H or
   OH, or $C_1$-$C_{12}$;
   R1 is OH; and
   R2 is $PO_3H_2$, $SO_3H$, COOH; or
   a salt thereof.

11. The article of claim 1 wherein the layers comprising the inorganic oxide nanoparticles comprising the phosphorous-containing surface treatment are alternated with layers comprising a polycation forming a bi-layer.

12. The article of claim 11 wherein the polycation is a polyelectrolyte that is not a phosphorous-containing material.

13. The article of claim 11 wherein the polycation comprises inorganic nanoparticles lacking the phosphorous-containing surface treatment.

14. The article of claim 10 wherein the bi-layer has a refractive index of at least 1.40.

15. The article of claim 1 wherein the substrate is a light transmissive inorganic or organic polymeric material.

16. The article of claim 1 wherein the substrate is an optical film, architectural film, greenhouse film, window film, protection film, fenestration product, solar light tube film, traffic signage film, commercial graphics film, a solar photovoltaic front-sheet film, a solar power concentrating mirror, or light transmissive cover of a light bulb.

17. An article comprising a bi-layer comprising a monolayer of a polycation and a monolayer of a polyanion, wherein the polyanion comprises inorganic oxide nanoparticles comprising a phosphorous-containing surface treatment.

* * * * *

UNITED STATES PATENT AND TRADEMARK OFFICE
CERTIFICATE OF CORRECTION

PATENT NO. : 10,365,415 B2
APPLICATION NO. : 15/103948
DATED : July 30, 2019
INVENTOR(S) : Schmidt It is certified that error appears in the above-identified patent and that said Letters Patent is hereby corrected as shown below:

In the Specification

Column 1,
Line 6, delete "REFRENCE" and insert -- REFERENCE --, therefor.
Line 6, delete "REALATED" and insert -- RELATED --, therefor.
Line 10, delete "Dec. 19, 2014," and insert -- Dec. 17, 2014, --, therefor.

Column 7,
Line 52, delete "potassiumas" and insert -- potassium as --, therefor.

Column 8,
Line 36, delete "therof." and insert -- thereof. --, therefor.

Column 9,
Line 5, delete "treatement)" and insert -- treatment) --, therefor.
Line 26, delete "poly(dially-" and insert -- poly(diallyl- --, therefor.
Line 32, delete "poly(dially-" and insert -- poly(diallyl- --, therefor.

Column 10,
Line 7, delete "(vinylbenzyltriamethylamine)," and insert -- (vinylbenzyltrimethylamine), --, therefor.

Column 11,
Lines 6 & 7, delete "or or" and insert -- or --, therefor.

Column 16,
Line 34, delete "infared" and insert -- infrared --, therefor.

Column 17,
Line 62, delete "tetrafluoroethyelene" and insert -- tetrafluoroethylene --, therefor.

Signed and Sealed this
Seventeenth Day of September, 2019

Andrei Iancu
*Director of the United States Patent and Trademark Office*

Column 21,
Line 51, delete "as as" and insert -- as --, therefor.

Column 24,
Line 30, after "observed" insert -- . --.
Line 55, delete "NaC1," and insert -- NaCl, --, therefor.